United States Patent
Hiraoka et al.

[11] Patent Number: 6,038,149
[45] Date of Patent: Mar. 14, 2000

[54] LAMP DISCHARGE LIGHTING DEVICE POWER INVERTER

[75] Inventors: Toshiyuki Hiraoka, Numazu; Masahiro Sugiyama, Gotenba; Hiroshi Kubota; Takafumi Takeda, both of Shizuoka; Kazuyuki Yamamoto, Ito, all of Japan

[73] Assignee: Kabushiki Kaisha TEC, Japan

[21] Appl. No.: 08/995,578

[22] Filed: Dec. 22, 1997

[30] Foreign Application Priority Data

Dec. 25, 1996 [JP] Japan ................................. 8-346233
Dec. 26, 1996 [JP] Japan ................................. 8-348290

[51] Int. Cl.[7] ............................................. H02M 5/458
[52] U.S. Cl. ..................................... 363/37; 363/48
[58] Field of Search ........................ 363/34, 37, 44, 363/47, 48

[56] References Cited

U.S. PATENT DOCUMENTS

| | | | |
|---|---|---|---|
| 4,564,897 | 1/1986 | Okamoto et al. | 363/47 |
| 4,849,950 | 7/1989 | Sugiura et al. | 363/48 |
| 5,251,119 | 10/1993 | Maehara | 363/37 |
| 5,301,095 | 4/1994 | Teramoto et al. | 363/37 |
| 5,331,534 | 7/1994 | Suzuki et al. | 363/34 |
| 5,410,466 | 4/1995 | Maehara | 363/44 |
| 5,517,403 | 5/1996 | Maehara | 363/47 |
| 5,563,777 | 10/1996 | Miki et al. | 363/37 |
| 5,740,022 | 4/1998 | Abe | 363/47 |
| 5,764,496 | 6/1998 | Sato et al. | 363/34 |
| 5,875,107 | 2/1999 | Nagai et al. | 363/37 |

*Primary Examiner*—Jeffrey Sterrett
*Attorney, Agent, or Firm*—Morrison Law Firm

[57] ABSTRACT

A power supply device and a discharge lamp lighting device which are capable of reducing high harmonic elements and improving a crest factor. A full-wave rectifying circuit is connected to a commercial AC power supply. A first capacitor, a diode and second capacitor, having a smaller capacitance than the first capacitor, are connected to the full-wave rectifying circuit. A partially smoothed circuit consisting of a charge capacitor, an inductor and a diode is connected to the second capacitor. A parallel resonance circuit and a collector-emitter of a transistor are connected to the partially smoothed circuit. The parallel resonance circuit consists of a primary winding of an inverter transformer and a first resonance capacitor. A second resonance capacitor is connected between the emitter and the collector of the transistor. Filaments of a fluorescent lamp are connected to a secondary winding of the inverter transformer. A starting capacitor is connected to the filaments.

13 Claims, 24 Drawing Sheets

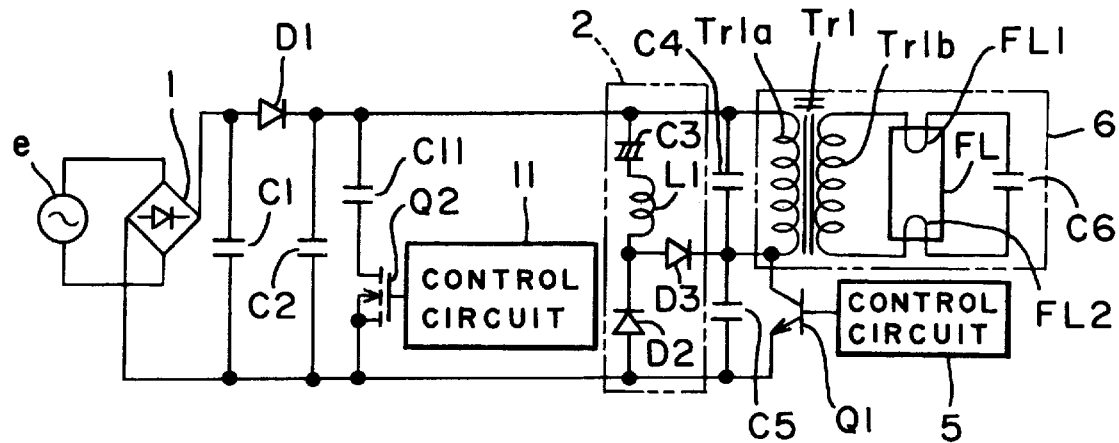
F I G. 6
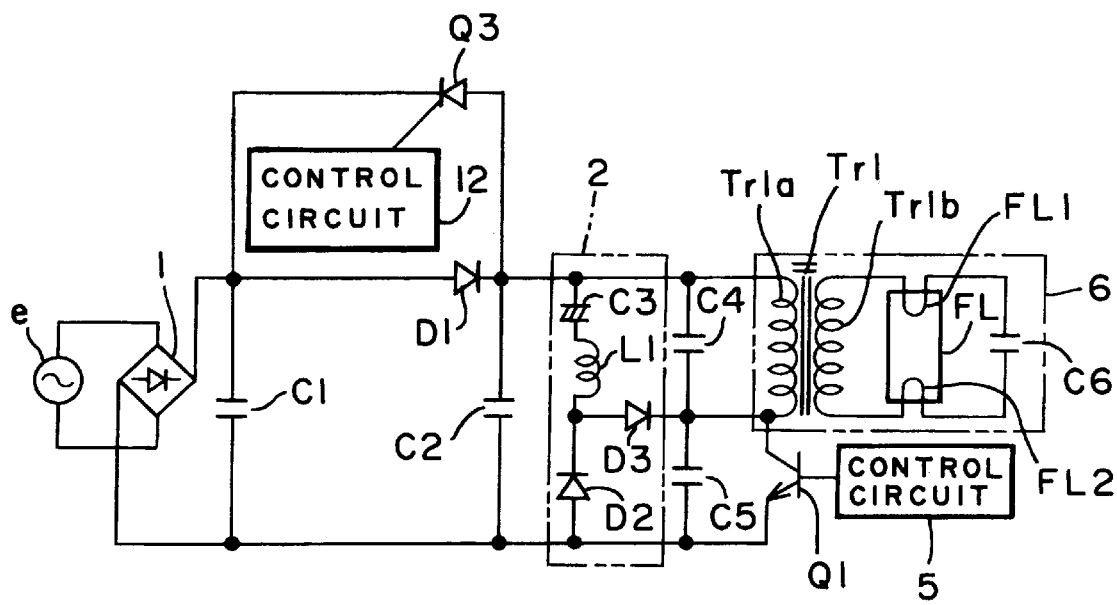
F I G. 7
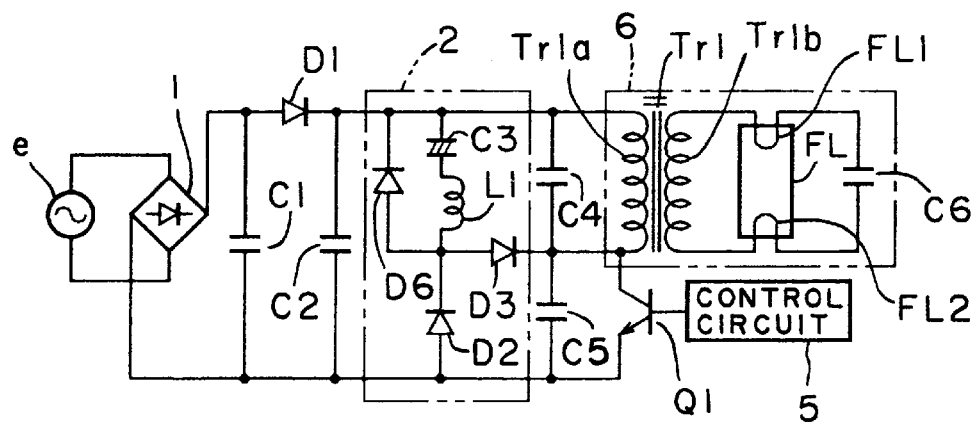
F I G. 8

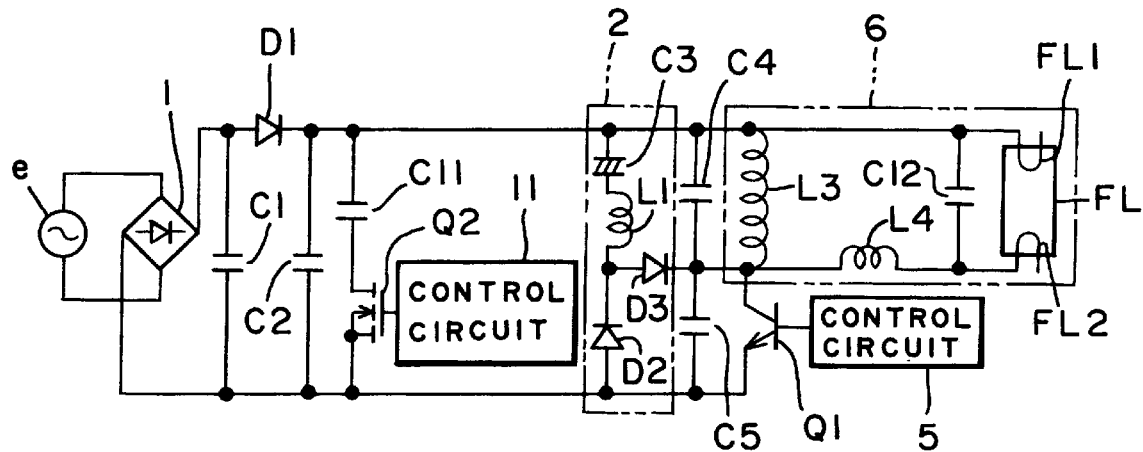
F I G. 26
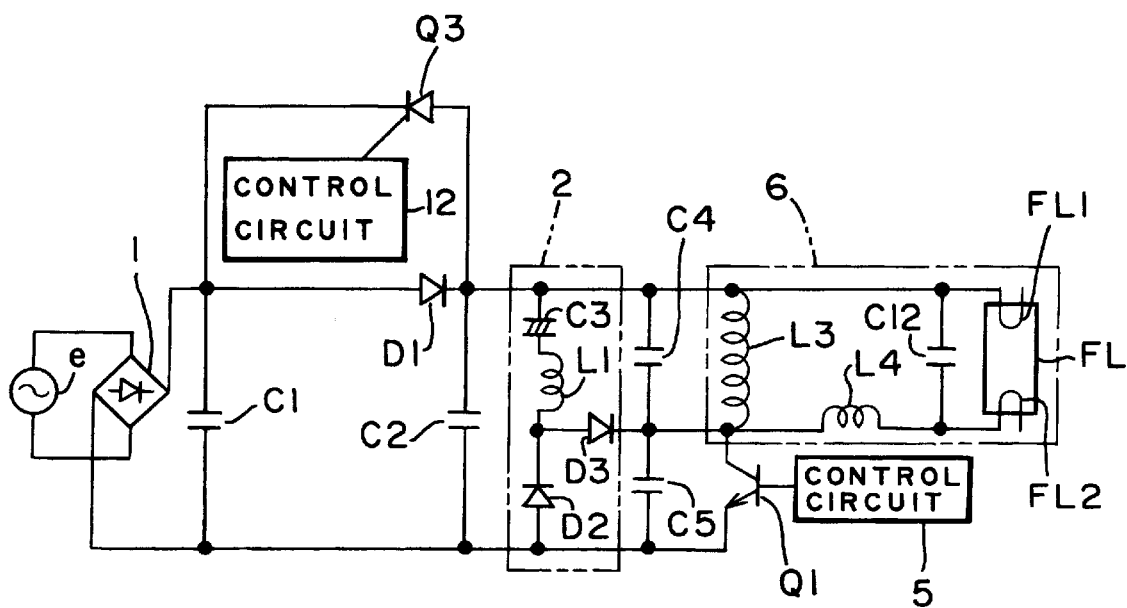
F I G. 27 though Japanese Patent Laid-

LAMP DISCHARGE LIGHTING DEVICE POWER INVERTER

BACKGROUND OF THE INVENTION

The present invention relates to a power supply device and a discharge lamp lighting device.

An example of conventional discharge lamp lighting devices of this type is disclosed in Japanese Patent Laid-open No. 211774-1993, wherein a full-wave rectifying circuit is connected to a commercial AC power supply. A parallel resonance circuit, which comprises a resonance capacitor and an inverter transformer, and a transistor, are connected in series with an output terminal of the full-wave rectifying circuit, thereby forming an inverter circuit. In addition, a partially smoothing circuit, which includes a series circuit comprising a charge capacitor, an inductor and a first diode, and also includes a second diode is disposed between and connected to the first diode and the transistors connected to the full-wave rectifying circuit. A fluorescent lamp is connected to the inverter transformer With the configuration as the fluorescent lamp is turned on with high-frequency AC current by means of high frequency switching of the transistor, thereby inducing high frequency AC voltage in the inverter transformer.

When the transistor is turned on while the voltage on the full-wave rectifying circuit is high, the charge capacitor is charged through the circuit formed by the full-wave rectifying circuit, the charge capacitor, the second diode, the transistor and back to the full-wave rectifying circuit.

When the transistor is turned off, the magnetic energy stored in the inductor continues to flow through the second diode. When the magnetic energy of the inductor is discharged, the second diode is turned off so that the voltage on the transistor is applied to the second diode. At that time, according to the duty ratio of the transistor, a voltage lower than the output voltage of the full-wave rectifying circuit is charged into the charge capacitor. When the input voltage becomes lower than the charging voltage on the charge capacitor, the charge capacitor discharges its stored energy through the first diode and the inductor to the inverter circuit. A substantially constant DC voltage is supplied to the inverter circuit, with its power factor improved to approximately 0.9.

Due to an insufficient voltage from the charge capacitor and the partially smoothed circuit, however, the discharge lamp lighting device disclosed in Japanese Patent Laid-open No. 1211774-1993 presents some problems in its crest factor (the ratio of peak value to effective value of a periodic wave).

Furthermore, when the transistor was switched off with the capacitor charged, the magnetic energy of the inductor permits the current which flowed through the inductor and charged the charge capacitor to flow through the inductor, the second diode, the resonance capacitor and the charge capacitor. Therefore, energy other than the oscillation energy of the inverter circuit flows into the resonance capacitor When the second diode is in the 'on' state, the voltage on the first diode is equal to the voltage on the transistor, and the voltage minus the charge voltage on the charge capacitor is applied to the inductor. Therefore, since it is necessary to increase the voltage resistance capacities of these elements, the conventional device described above presents another problem in that reducing the size of the device is difficult.

OBJECTS AND SUMMARY OF THE INVENTION

It is an object of the invention to provide a power supply for a fluorescent lamp which overcomes the drawbacks of the prior art.

It is a further object of the invention to provide a power supply for a fluorescent lamp which emits lower electrical interference.

It is a still further object of the invention to provide a power supply for a fluorescent lamp, wherein a switching speed is increased during startup, thereby reducing the time for reaching normal operation.

Briefly stated, the present invention provides a power supply device and a discharge lamp lighting device which are capable of reducing high harmonic elements and improving a crest factor. A full-wave rectifying circuit is connected to a commercial AC power supply. A first capacitor, a diode and second capacitor, having a smaller capacitance than the first capacitor, are connected to the full-wave rectifying circuit. A partially smoothed circuit consisting of a charge capacitor, an inductor and a diode is connected to the second capacitor. A parallel resonance circuit and a collector-emitter of a transistor are connected to the partially smoothed circuit. The parallel resonance circuit consists of a primary winding of an inverter transformer and a first resonance capacitor. A second resonance capacitor is connected between the emitter and the collector of the transistor. Filaments of a fluorescent lamp are connected to a secondary winding of the inverter transformer. A starting capacitor is connected to the filaments.

The present invention includes a rectifying means for rectifying alternating current from an AC power supply; a first capacitor connected in parallel with an input terminal of the rectifying means; a diode connected in series in the normal polarity with an end of said first capacitor; a second capacitor connected in parallel with the first capacitor through the diode; a partially smoothed circuit which includes an inductance element and a charge capacitor; the partially smoothed circuit is connected in parallel with said second capacitor, the second capacitor is adapted to charge said charge capacitor at a voltage lower than the maximum instantaneous voltage output from the rectifying means; and an inverter circuit which includes a parallel resonance circuit, a switching element and a second resonance capacitor; said inverter circuit is connected in parallel with said partially smoothed circuit, said parallel resonance circuit having a first resonance capacitor and a resonance inductor, said switching element connected in series with the parallel resonance circuit, the second resonance capacitor connected in parallel with the switching element, and thus structured inverter circuit adapted to generate high frequency voltage by high-frequency switching of the switching element.

With the configuration as above, by feeding input current from the first and second capacitors when the output level of the rectifying means is equivalent to or higher than the charge level on the charge capacitor, and feeding current from the partially smoothed circuit when the output level of the rectifying means is lower than the charge level on the charge capacitor, the inverter circuit causes the parallel resonance circuit and the second resonance capacitor to resonate by means of switching actions of the switching element, thereby reducing high frequency harmonics. Furthermore, by permitting the resonance current to flow into the second capacitor, the inverter circuit produces high frequency output having an improved crest factor.

According to another feature thereof, the invention includes a first capacitor connected to an AC power supply; a rectifying means connected to the first capacitor; a second capacitor connected to the rectifying means; a partially smoothed circuit which includes an inductance element and a charge capacitor; the partially smoothed circuit is connected in parallel with said second capacitor, the second capacitor is adapted to charge said charge capacitor at a voltage lower than the maximum instantaneous voltage output from the rectifying means; and an inverter circuit which includes a parallel resonance circuit, a switching element and a second resonance capacitor; said inverter circuit is connected in parallel with said partially smoothed circuit, said parallel resonance circuit having a first resonance capacitor and a resonance inductor, said switching element connected in series with the parallel resonance circuit, the second resonance capacitor connected in parallel with the switching element, and the thus structured converter circuit is adapted to generate high frequency voltage by means of switching actions of the switching element.

With the configuration as above, by feeding input current from the first and second capacitors when the output level of the rectifying means is equivalent to or higher than the charge level on the charge capacitor, and feeding current from the partially smoothed circuit when the output level of the rectifying means is lower than the charge level on the charge capacitor, the inverter circuit causes the parallel resonance circuit and the second resonance capacitor to resonate by means of switching actions of the switching element, thereby reducing high harmonics. Furthermore, by permitting the resonance current to flow into the second capacitor, the inverter circuit produces high frequency output having an improved crest factor.

According to yet another feature thereof, the present invention includes a rectifying means for rectifying alternating current from an AC power supply; a first capacitor connected in parallel with an input terminal of the rectifying means; a diode connected to said first capacitor; a second capacitor connected in parallel with the diode; a partially smoothed circuit which includes an inductance element and a charge capacitor; the partially smoothed circuit is connected in parallel with said first capacitor through said second capacitor and the diode, the second capacitor adapted to charge said charge capacitor at a voltage lower than the maximum instantaneous voltage output from the rectifying means; and an inverter circuit which includes a parallel resonance circuit, a switching element and a second resonance capacitor; said inverter circuit is connected in parallel with said partially smoothed circuit, said parallel resonance circuit having a first resonance capacitor and a resonance inductor, said switching element connected in series with the parallel resonance circuit, the second resonance capacitor connected in parallel with the switching element, and the thus structured inverter circuit is adapted to generate high frequency voltage by means of switching actions of the switching element.

With the configuration as above, by feeding input current from the first and second capacitors when the output level of the rectifying means is equivalent to or higher than the charge level on the charge capacitor, and feeding current from the partially smoothed circuit when the output level of the rectifying means is lower than the charge level on the charge capacitor, the inverter circuit causes the parallel resonance circuit and the second resonance capacitor to resonate by means of switching actions of the switching element, thereby reducing high harmonics. Furthermore, by permitting the resonance current to flow into the second capacitor, the inverter circuit produces high frequency output having an improved crest factor.

According to another feature thereof, the invention includes a short-circuiting means adapted to short-circuit the diode in accordance with an output level of the rectifying means so that a load applied to the switching element can be reduced by changing the resonance point.

According to another feature thereof, the invention includes a capacitance varying means for changing the capacitance of the second capacitor. By optimizing the capacitance of the second capacitor so that the voltage is reduced to zero in when the voltage of the second capacitor is low, high harmonics can be further reduced.

According to another feature of the invention, the first resonance capacitor and the second resonance capacitor have nearly the same capacitances so that a further improved waveform is provided.

According to another feature thereof, the invention includes a rectifying means for rectifying alternating current from an AC power supply; an inverter circuit which includes a parallel resonance circuit comprising a resonance capacitor and a resonance inductor, and a switching element connected in series with the parallel resonance circuit, said inverter circuit adapted to generate high frequency voltage by means of switching actions of the switching element; and a partially smoothed circuit which includes a series circuit consisting of an inductor, a charge capacitor and a first diode, a second diode, and a third diode; the charge capacitor adapted to be charged at a voltage lower than the maximum instantaneous voltage output from the rectifying means; the first diode connected in such a polarity as to correspond to that of discharge current from the charge capacitor; the second diode disposed between and connected to said switching element and the combination of the inductor and the first diode in such a polarity as to permit current for charging the charge capacitor to flow therethrough, and the third diode connected in parallel with the charge capacitor and the inductor in such a polarity as to permit magnetic energy accumulated in the inductor to flow to the charge capacitor when the charge capacitor is charged.

With the configuration as above, voltage stored in the inductor through the third diode is returned to the charge capacitor, and when the switching element is switched off during the charging period of the charge capacitor, the magnetic energy of the inductor further charges the charge capacitor along the path from the inductor through the third diode to the charge capacitor so that electric current flows to the second diode only while the switching element is on during the charging period and that all the voltage generated on the switching element when the switching element is switched off is applied to the second diode. Therefore, since voltage applied to the first diode and the inductor can be thus reduced, the sizes of these components can be reduced through reducing their ability to withstand voltage According to another feature thereof, the invention includes a rectifying means for rectifying alternating current from an AC power supply; a first capacitor connected in parallel with an input terminal of the rectifying means; a diode connected in series in the normal polarity with an end of said first capacitor; a second capacitor connected in parallel with the first capacitor through the diode; an inverter circuit which includes a parallel resonance circuit comprising a resonance capacitor and a resonance inductor, and a switching element connected in series with the parallel resonance circuit, said inverter circuit adapted to generate high frequency voltage by means of switching actions of the switching element; and a partially smoothed circuit which includes a series circuit consisting of an inductor, a charge capacitor and a first diode, a second diode, and a third diode, the charge capacitor adapted to be charged at a voltage lower than the maximum instantaneous voltage output from the rectifying means, the first diode connected in such a polarity as to correspond to that of discharge current from the charge capacitor, the second diode disposed between and connected to said switching element and the combination of the inductor and the first diode in such a polarity as to permit current for charging the charge capacitor to flow therethrough, and the third diode connected in parallel with the charge capacitor and the inductor in such a polarity as to permit magnetic energy accumulated in the inductor to flow to the charge capacitor when the charge capacitor is charged.

With the configuration as above, by feeding input current from the first and second capacitors when the output level of the rectifying means is equal to or higher than the charge level on the charge capacitor, and feeding current from the partially smoothed circuit when the output level of the rectifying means is lower than the charge level on the charge capacitor, the inverter circuit causes the parallel resonance circuit and the second resonance capacitor to resonate by means of switching actions of the switching element, thereby reducing high harmonics. Further, voltage charged on the inductor through the third diode is returned to the charge capacitor. When the switching element is switched off during the charging period of the charge capacitor, the magnetic energy of the inductor further charges the charge capacitor along the path from the inductor through the third diode to the charge capacitor so that electric current flows to the second diode only while the switching element is on during the charging period and that all the voltage generated on the switching element when the switching element is switched off is applied to the second diode. Therefore, voltage applied to the first diode and the inductor can be thus reduced, the sizes of these components can be reduced through reducing their capacity for withstanding voltage.

According to another feature thereof, the invention includes a first capacitor connected to an AC power supply; a rectifying means connected to the first capacitor; a second capacitor connected to the rectifying means; an inverter circuit which includes a parallel resonance circuit comprising a resonance capacitor and a resonance inductor, and a switching element connected in series with the parallel resonance circuit, said inverter circuit adapted to generate high frequency voltage by means of switching actions of the switching element; and a partially smoothed circuit which includes a series circuit consisting of an inductor, a charge capacitor and a first diode, a second diode, and a third diode, the charge capacitor adapted to be charged at a voltage lower than the maximum instantaneous voltage output from the rectifying means, the first diode connected in such a polarity as to correspond to that of discharge current from the charge capacitor, the second diode disposed between and connected to said switching element and the combination of the inductor and the first diode in such a polarity as to permit current for charging the charge capacitor to flow therethrough, and the third diode connected in parallel with the charge capacitor and the inductor in such a polarity asks permit magnetic energy accumulated in the inductor to flow to the charge capacitor when the charge capacitor is charged.

With the configuration as above, by feeding input current from the first and second capacitors when the output level of the rectifying means is equivalent to or higher than the charge level on the charge capacitor, and feeding current from the partially smoothed circuit when the output level of the rectifying means is lower than the charge level on the charge capacitor, the inverter circuit causes the parallel resonance circuit and the second resonance capacitor to resonate by means of switching actions of the switching element, thereby reducing high harmonics. Further, voltage charged on the inductor through the third diode is returned to the charge capacitor, and when the switching element is switched off during the charging period of the charge capacitor, the magnetic energy of the inductor further charges the charge capacitor along the path from the inductor through the third diode to the charge capacitor so that electric current flows to the second diode only while the switching element is on during the charging period and that all the voltage generated on the switching element when the switching element is switched off is applied to the second diode. Therefore, since voltage applied to the first diode and the inductor can be thus reduced, the sizes of these components can be reduced through reducing their capacity of withstanding voltage.

According to another feature thereof, the invention includes a rectifying means for rectifying alternating current from an AC power supply; a first capacitor connected in parallel with an output terminal of the rectifying means; a diode connected to the first capacitor; a second capacitor connected in parallel with said diode; an inverter circuit which includes a parallel resonance circuit comprising a resonance capacitor and a resonance inductor, and a switching element connected in series with the parallel resonance circuit, said inverter circuit adapted to generate high frequency voltage by means of switching actions of the switching element; and a partially smoothed circuit which includes a series circuit consisting of an inductor, a charge capacitor and a first diode, a second diode, and a third diode, the charge capacitor adapted to be charged at a voltage lower then the maximum instantaneous voltage output from the rectifying means, the first diode connected in such a polarity as to correspond to that of discharge current from the charge capacitor, the second diode disposed between and connected to said switching element and the combination of the inductor and the first diode in such a polarity as to permit current for charging the charge capacitor to flow therethrough, and the third diode connected in parallel with the charge capacitor and the inductor in such a polarity as to permit magnetic energy accumulated in the inductor to flow to the charge capacitor when the charge capacitor is charged.

With the configuration as above, by feeding input current from the first and second capacitors when the output level of the rectifying means is equal to or higher than the charge level on the charge capacitor, and feeding current from the partially smoothed circuit when the output level of the rectifying means is lower than the charge level on the charge capacitor, the inverter circuit causes the parallel resonance circuit and the second resonance capacitor to resonate by means of switching actions of the switching element, thereby reducing high harmonics. Further, voltage charged on the inductor through the third diode is returned to the charge capacitor, and when the switching element is switched off during the charging period of the charge capacitor, the magnetic energy of the inductor further charges the charge capacitor along the path from the inductor through the third diode to the charge capacitor so that electric current flows to the second diode only while the switching element is on during the charging period and that all the voltage generated on the switching element when the switching element is switched off is applied to the second diode. Therefore, since voltage applied to the first diode and the inductor can be thus reduced, the sizes of these components can be reduced through reducing their ability to withstand voltage.

According to another feature thereof, the invention includes a control circuit adapted to set the frequency at which the inverter circuit is driven so that the frequency is higher when the circuit starts to oscillate than during the normal operating period. By increasing the oscillation frequency of the switching element at the beginning of oscillation compared with the normal frequency, the peak value of the current that flows through the charge capacitor, the inductor, the first diode and the switching element is reduced until the charge capacitor in the partially smoothed circuit is charged to a given voltage. Thus, stress on the switching element is reduced According to another feature thereof, the invention includes an auxiliary charging circuit adapted to charge the charge capacitor by the time the inverter circuit initiates oscillation. Since the charge capacitor is charged by the auxiliary charging circuit before the inverter circuit initiates oscillation, stress on the switching element is reduced.

According to another feature thereof, the invention includes a discharge lamp connected to a power supply device according to the present invention and achieves the same effect as those the corresponding power supply device is capable of.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 6, 6(A) and 6(B) are circuit diagrams of discharge lamp lighting devices according to a $4^{th}$ embodiment of the present invention.

FIGS. 7 and 7(A) are circuit diagrams of discharge lamp lighting devices according to a $5^{th}$ embodiment of the present invention.

FIG. 8 is a circuit diagram of a discharge lamp lighting device according to a $6^{th}$ embodiment of the present invention.

FIG. 26 is a circuit diagram of a discharge lamp lighting device according to a $24^{th}$ embodiment of the present invention.

FIG. 27 is a circuit diagram of a discharge lamp lighting device according to a 25th embodiment of the present invention.

DETAILED DESCRIPTION OF THE PREFERRED EMBODIMENT

Figure 1:
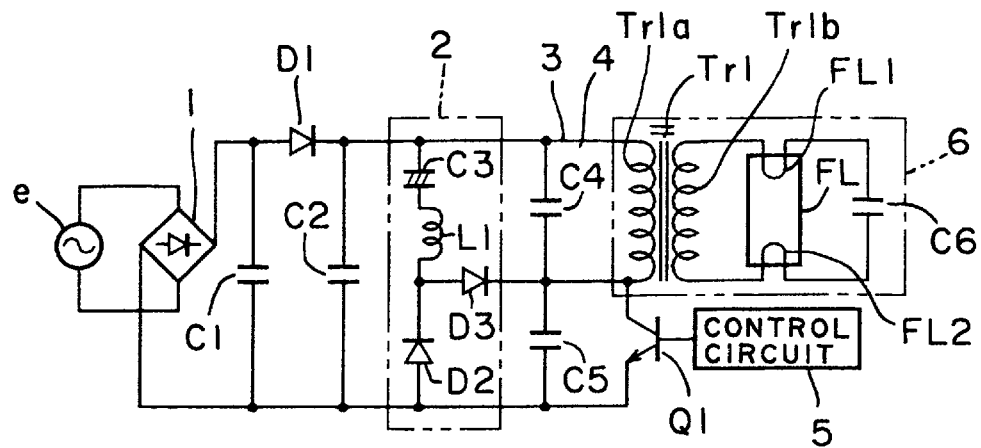
FIG. 1 is a circuit diagram of a discharge lamp lighting device according to a first embodiment of the present invention.

Referring to FIG. 1, a discharge lamp lighting device according to the first embodiment of the invention employs a full wave diode bridge rectifying circuit 1 connected to a commercial AC power supply e. A first capacitor C1 having a large capacitance is connected to an output terminal of the full-wave rectifying circuit 1. A series circuit consisting of a diode D1 and a second capacitor C2, which has a capacitance smaller than the first capacitor C1, is connected to the first capacitor C1. The second capacitor C2 is also connected to a partially smoothed circuit 2. Partially smoothed circuit 2 includes a series circuit consisting of a charge capacitor C3, an inductor L1 and a diode D2. A diode D3 connected between inductor L1 and the diode D2.

The partially smoothed circuit 2 is connected to an inverter circuit 3. Inverter circuit 3 includes a parallel circuit consisting of a primary winding Tr1a of a leakage flux type inverter transformer Tr1 and a first resonance capacitor C4. The inverter transformer Tr1 serves as a resonance inductor.

The inverter circuit 3 also includes a collector-emitter path of a transistor Q1 which serves as a switching element. In addition, a second resonance capacitor C5 is disposed between and connected in parallel to the collector-emitter path of the transistor Q1.

A control circuit 5 is connected to the base of the transistor Q1. Filaments FL1, FL2 of a fluorescent lamp FL, serving as a discharge lamp, are connected to opposed ends of a secondary winding Trib of inverter transformer Tr1. A starting capacitor C6 is connected between the other terminals of the filaments FL1, FL2.

The fluorescent lamp FL and other elements mentioned above make up a load circuit 6.

When the inverter circuit 3 is actuated to oscillate by on-off switching of the transistor Q1 by the control circuit 5, resonance of the primary winding Tr1a of the inverter transformer Tr1 and the resonance capacitor C4 generates a high frequency voltage, thereby inducing a high frequency voltage also on the secondary winding Trib.

When the transistor Q1 is switched on, electric current flows to the primary winding Tr1a of the inverter transformer Tr1 while electric current also flows through the charge capacitor C3, the inductor L1 and the diode D3 so that the charge capacitor C3 is charged. The device stores in the charge capacitor C3 a DC voltage that is lower than the peak voltage of the pulsating current from the full-wave rectifying circuit 1.

In the voltage range of the pulsating current from the full-wave rectifying circuit 1 that is higher than the charge voltage of the charge capacitor C3, when the transistor Q1 of the inverter circuit 3 is switched on in an arbitrary time period in the range where the voltage of the pulsating current in the full-wave rectifying circuit 1 is higher than the voltage charged on the charge capacitor C3, electric current is supplied to the primary winding Tr1a of the inverter transformer Try mainly from the first capacitor C1 and partly from the second capacitor C2. The combined capacitance of the first and second capacitors C1, C2 is sufficient to give the energy required by the inverter circuit 3. Energy corresponding to the current supplied from the first capacitor C1 and the second capacitor C2 flows in the form of input current from the commercial AC power supply e. In accordance with changes of the voltage of pulsating current, the device copes with switching actions of the transistor Q1 so that, along with increases in value of AC voltage sinusoidal waves, the slight and uniform amplitude of high frequency waves produced by the inverting action of the inverter circuit 3 is superimposed over the entire range where the voltage of the full-wave rectifying circuit 1 is high.

In the range where the pulsating current from the full-wave rectifying circuit 1 is lower than the stored voltage in charge capacitor C3, the combined value of respective voltages on the first capacitor C1 and the second capacitor C2 corresponds to the value of the energy given by the supplied pulsating current voltage. That energy satisfies the energy required by the inverter circuit 3. Therefore, both the first and second capacitors C1, C2 produce only minimal ripple and heat and improved reliability of the circuit is obtained.

In the range where the voltage of the full-wave rectifying circuit 1 is high, the charge capacitor C3 is charged when the transistor Q1 is on. In the high-voltage range of the full-wave rectifying circuit 1, there is no discharge of current from the changing capacitor C3 to the inverter circuit 3. Then, in the range where the voltage of the full-wave rectifying circuit 1 is low, when the transistor Q1 is turned on at the beginning of decrease in pulsating current sinusoidal voltage in the full-wave rectifying circuit with respect to the charging voltage on the charge capacitor C3, the electric current to the primary winding Tr1a of the inverter transformer Tr1 is initially supplied from the second capacitor C2. Since the capacitance of the second capacitor C2 is insufficient to supply the energy necessary for the inverter circuit 3, the voltage on the second capacitor C2 decreases with the increase of current which flows into the primary winding Tr1a after the transistor Q1 is switched on. When the voltage on the second capacitor C2 is reduced to the voltage on the first capacitor C1, the first capacitor C1 starts to feed energy to the inverter circuit 3 to make up for the shortage of the energy supplied by the second capacitor C2.

Thus, energy continues to be fed until the transistor Q1 is turned off. During this period, the decrease in voltage on the second capacitor C2 slows down after the beginning of energy feed from the first capacitor C1. The energy fed from the first capacitor C1 causes an amount of energy equal to the fed energy to flow in the form of input electric current from the commercial AC power supply e.

Figure 2:
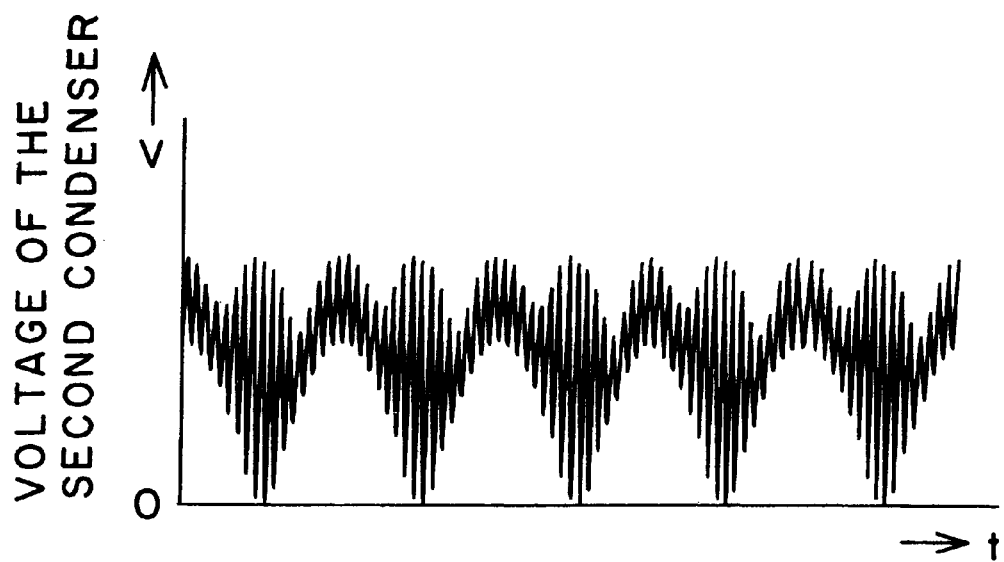
FIG. 2 is a waveform illustration of voltage on the second capacitor of same.

Meanwhile, due to the transient impedance of the inductor L1, the charging voltage on the charge capacitor C3 delays discharging energy. Energy discharge occurs just before the transistor Q1 is switched off. When the transistor Q1 is switched off, the charged voltage on the charge capacitor C3 becomes the source of feeding voltage to the series circuit which consists of the inductor L1, the diode D2 and the second capacitor C2. At that time, the charge to the second capacitor C2 is conducted in the form of sinusoidal waves, because the inductor L1 and the second capacitor C2 are so constructed as to achieve oscillatory resonance. The charged voltage is increased in the inverter circuit 3 to such a level that an insufficient supply of energy does not occur when the transistor Q1 is switched on next time. As a result of the switching off of the transistor Q1, resonance occurs between the primary winding Tr1a of the converter transformer Tr1 and the pair of resonance capacitors C4 and C5. The resonance current flows along a path formed by the second resonance capacitor C5, the primary winding Tr1a of the inverter transformer Tr1, the second capacitor C2 and the second resonance capacitor C5, and back to the second capacitor C2 is charged so that resonance voltage is generated. At that time, as shown in FIG. 2, voltages at both ends of the second capacitor C2 become close to DC voltages, the voltage corresponding to the maximum instantaneous voltage of the commercial AC power supply e being approximately equal to the voltage of the minimum instantaneous voltage.

Together with the decrease in the voltage on the first capacitor C1 with respect to the voltage charged on the charge capacitor C3, the voltage on the second capacitor C2 decreases so that the amplitude produced by the inductor L1 and the second capacitor C2 increases. Further, the current continues to be input, although the amount decreases.

As described above, the device permits current from the commercial AC power supply e to continue to flow, thereby preventing high harmonic elements from appearing in the input current.

Figure 3:
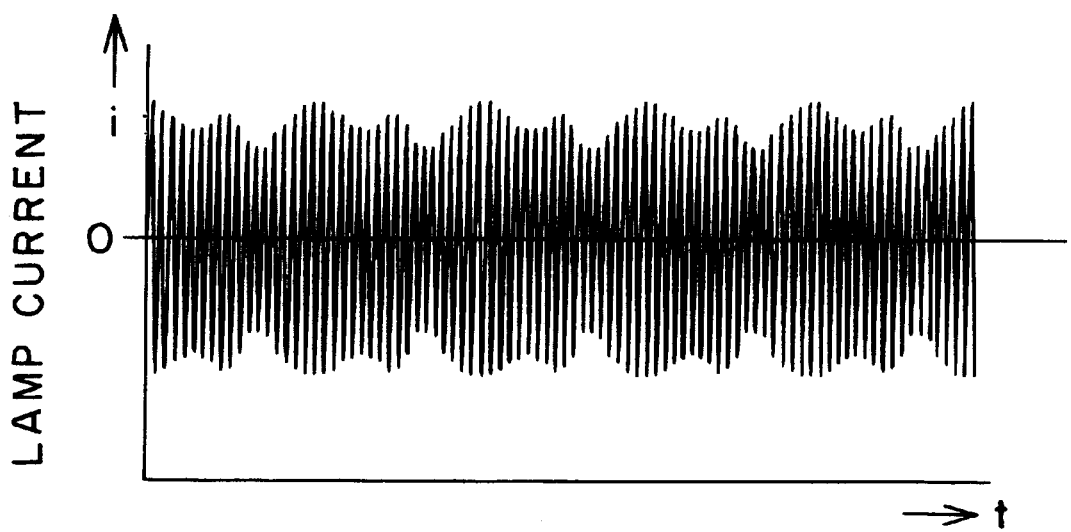
FIG. 3 is a waveform illustration of lamp current of the fluorescent lamp of same.

Furthermore, by increasing the fluctuation in voltage on the second capacitor C2, the crest factor of the waveform of the lamp current of the fluorescent lamp FL1 is improved as shown in FIG. 3.

Figure 4:
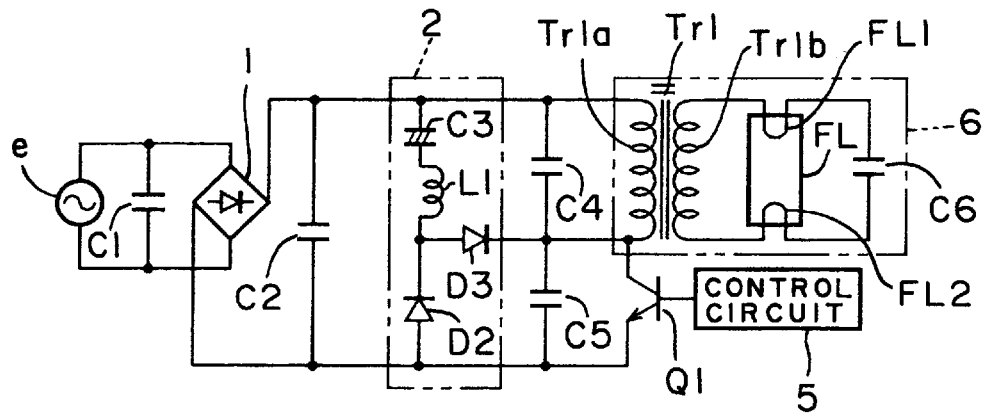
FIG. 4 is a circuit diagram of a discharge lamp lighting device according to a second embodiment of the present invention.

Referring now to FIG. 4, a second embodiment of a discharge lamp lighting device is similar to the discharge lamp lighting device according to the first embodiment shown in FIG. 1 except that the diode D1 omitted. First capacitor C1 is connected directly across the input supply e on the input side of full-wave circuit 1. The second capacitor C2 is connected across the output side of the full-wave circuit. By omitting the diode D1, the structure of the circuit can is simplified while ensuring virtually the same basic functions.

Figure 5:
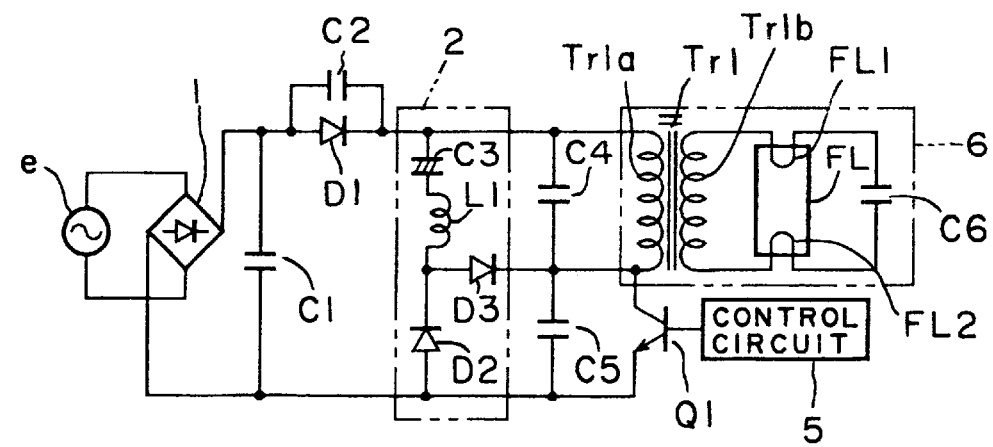
FIG. 5 is a circuit diagram of a discharge lamp lighting device according to a third embodiment of the present invention.

Referring now to FIG. 5, a discharge lamp lighting device according to a third embodiment of the present invention is similar to the discharge lamp lighting device according to the first embodiment shown in FIG. 1 except that the second capacitor C2 is connected in parallel with the diode D1.

Even with the configuration as above, the basic functions of the device are the same as those of the first embodiment.

Referring now to FIG. 6, a discharge lamp lighting device according to a fourth embodiment of the present invention is similar to the discharge lamp lighting device according to the first embodiment shown in FIG. 1 except that a series circuit consisting of a capacitor C11 and a field effect transistor Q2 is connected in parallel with the second capacitor C2, and the control circuit 11 is connected to the field effect transistor Q2. When the field effect transistor Q2 is turned on by control circuit 11, capacitor C11 is placed in parallel with the second capacitor C2. As a result, when the output of the inverter circuit 3 changes due to, for example, a change in temperature, the voltage on the low-voltage portion of the second capacitor is reliably reduced to zero by changing the combined capacitance of the second capacitor C2 and the capacitor C11. Thus, by ensuring continuous flow of input current, the device according to the fourth embodiment more reliably prevents high harmonics.

The same effect can be achieved by adding the above configuration to the third embodiment shown in FIG. 5.

Figure 6A:
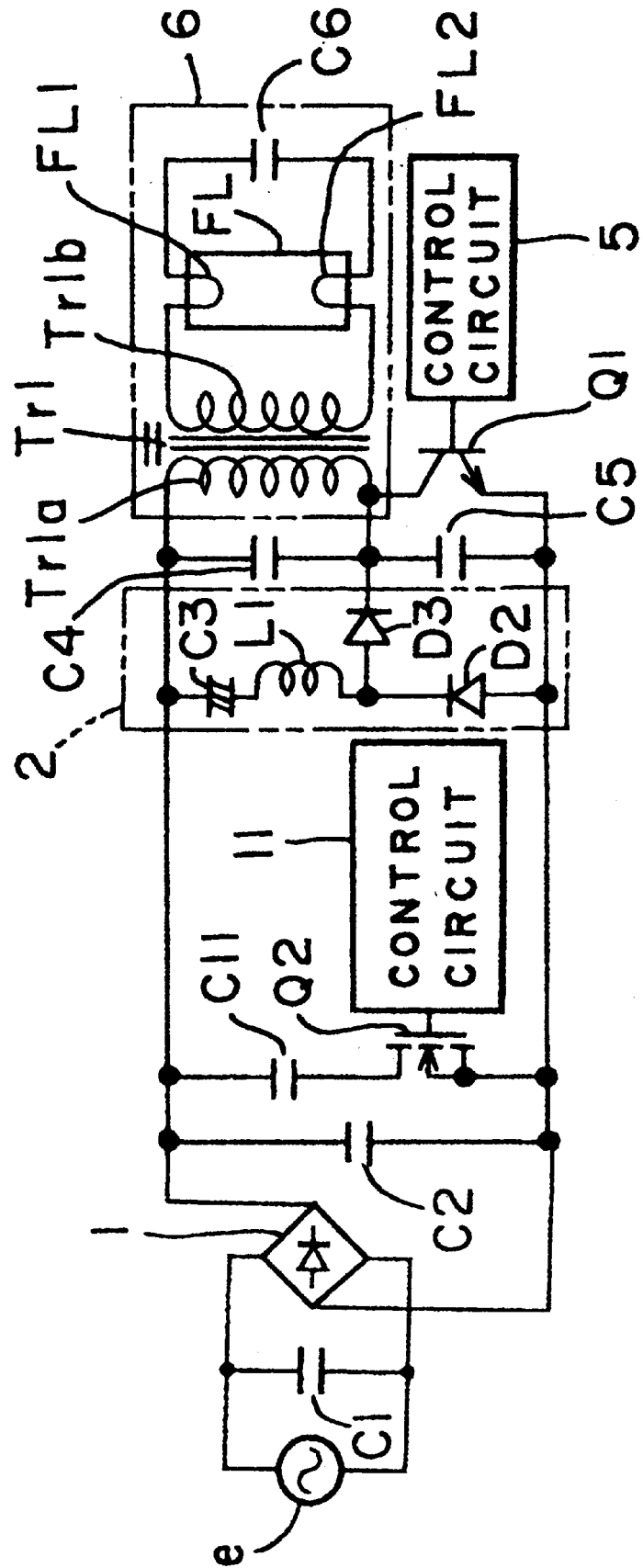
Figure 6B:
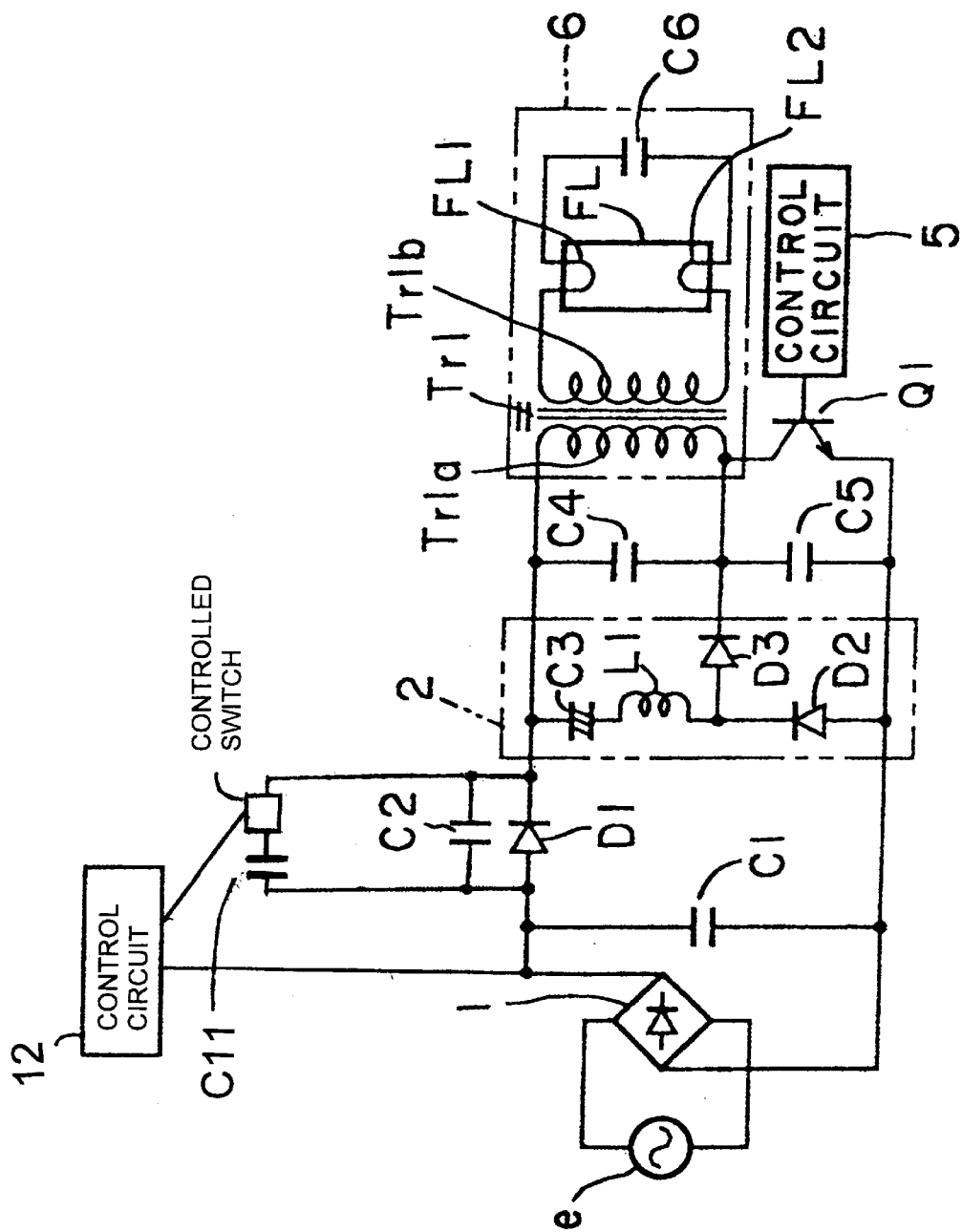

FIGS. 6(A) and 6(B) show the fourth embodiment of the invention as used in the circuits previously shown in FIGS. 4 and 5. As previously described, the second capacitor C2 can be controllably placed in parallel with capacitor C11.

Referring now to FIG. 7, a fifth embodiment of the invention is similar to the discharge lamp lighting device according to the first embodiment shown in FIG. 1 except that a thyristor Q3 serving as a short-circuiting means is connected in reverse polarity with the diode D1. A control circuit 12 is connected to a gate of the thyristor Q3.

Under normal circumstances, the inverter circuit 3 is enabled to function by boosting through resonance of the second capacitor C2 and the inverter transformer Tr1 of the inverter circuit 3, However, in the event where, for example, the lamp current of the fluorescent lamp FL increases, the thyristor Q3 is turned on to permit the electric current to flow in the direction opposite the diode D1, thereby reducing the voltage by permitting resonance between the inverter transformer Tr1 and the combination of the first and the second capacitors C1, C2, By thus charging the resonance point from the one for the resonance with the second capacitor C2 to one with the parallel combination of capacitors C1, C2, the device according to the fifth embodiment alleviates load applied to the transistor Q1.

The same effect can be achieved by adding the above configuration to the third embodiment or the fourth embodiment.

Figure 7A:
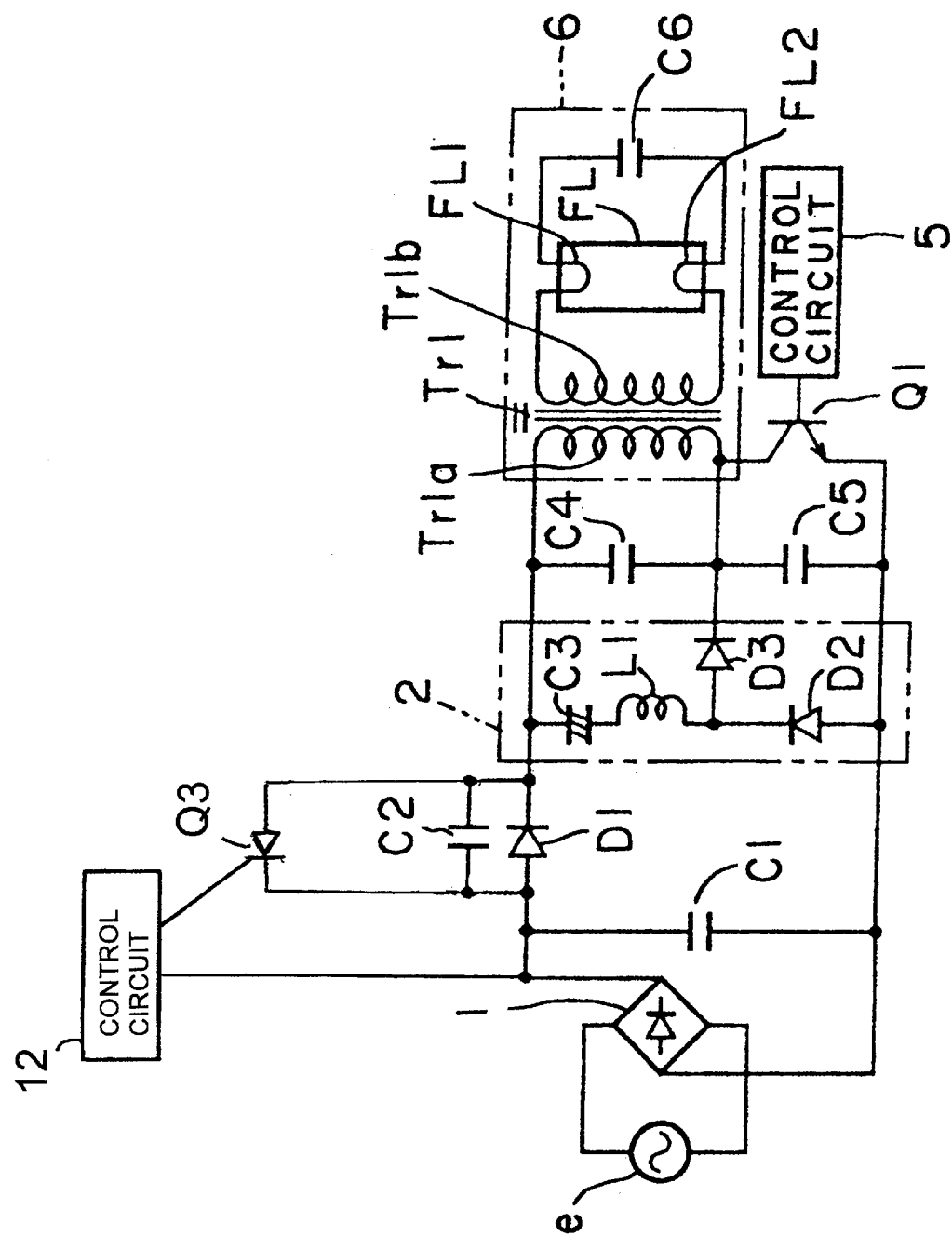

FIG. 7(A) shows the fifth embodiment of the invention as used in the circuit previously shown in FIG. 4. As previously described, the thyristor Q3 is turned on to permit the electric current to flow in the direction opposite the diode D1. The voltage is reduced by permitting resonance between the inverter transformer Tr1 and the first capacitor C1.

Referring now to FIG. 8, there is shown a discharge lamp lighting device according to the sixth embodiment of the present invention. The sixth embodiment is similar to the first embodiment in FIG. 1, except for the addition of a diode D6 connected across the series combination of the capacitor C3 and the inductor L1.

Figure 9:
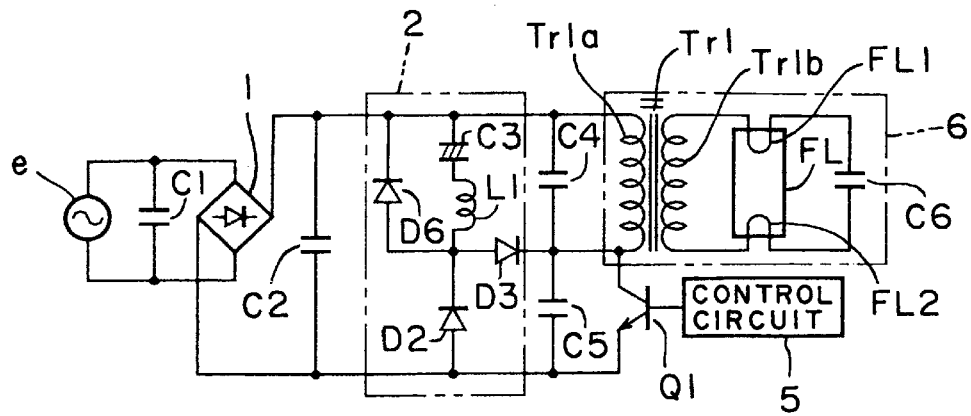
FIG. 9 is a circuit diagram of a discharge lamp lighting device according to a 7th embodiment of the present invention.

Referring now to FIG. 9, there is shown a seventh embodiment of the invention. The seventh embodiment is similar to the second embodiment in FIG. 4, except for the addition of a diode D6 connected across the series combination of the capacitor C3 and the inductor L1.

Figure 10:
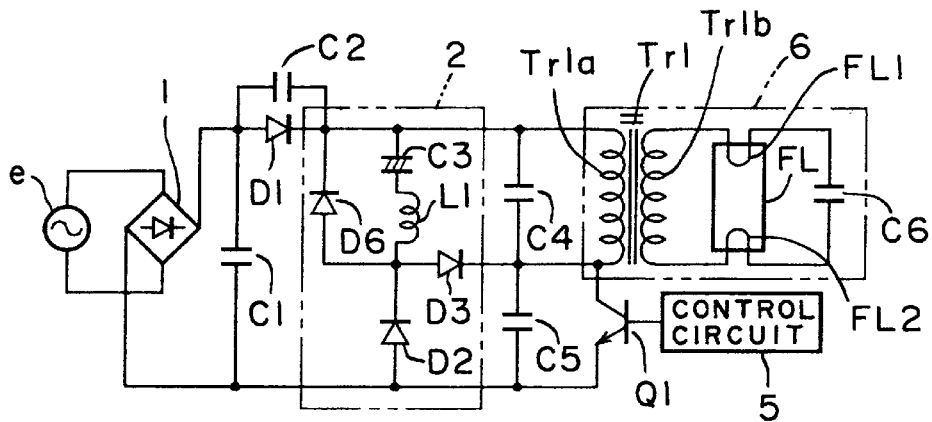
FIG. 10 is a circuit diagram of a discharge lamp lighting device according to an 8th embodiment of the present invention.

Referring now to FIG. 10, there is shown an eighth embodiment of the present invention. The eighth embodiment is similar to the embodiment in FIG. 5, except for the addition of a diode D6 connected across the series combination of the capacitor C3 and the inductor L1.

The discharge lamp lighting devices according to the sixth, seventh and eighth embodiments in FIGS. 8, 9 and 10, the charge capacitor C3 is charged by feeding magnetic energy through the diode D6 to the charge capacitor C3. As current flows through the diode D3, the diode D2 receives current only when the charge capacitor C3 discharges so that the voltage on the transistor Q1 is applied to the diode D3 while the transistor Q1 is off. Since the voltage applied to the inductor L1 and the diode D2 is thus reduced, the device can be made compact.

Figure 11:
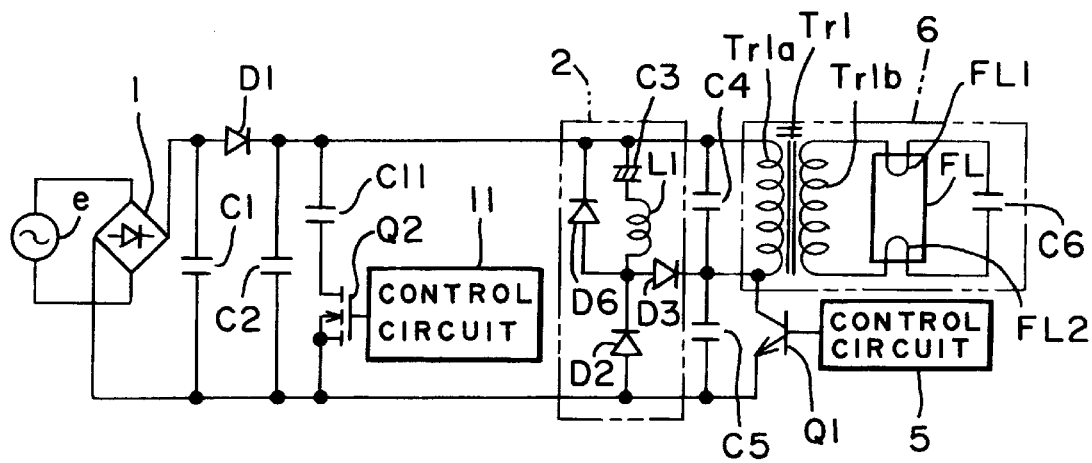
FIG. 11 is a circuit diagram of a discharge lamp lighting device according to a 9th embodiment of the present invention.

Referring now to FIG. 11, a discharge lamp lighting device according to a ninth embodiment of the invention is similar to the discharge lamp lighting device according to the sixth embodiment shown in FIG. 8 except that, as is true in the fourth embodiment, a series circuit consisting of a capacitor C11 and a field effect transistor Q2 is connected in parallel with the second capacitor C2. A control circuit 11 controls the on/off condition of the field effect transistor Q2

The same effect can be achieved by adding the above configuration to the seventh embodiment or the eighth embodiment.

Figure 12:
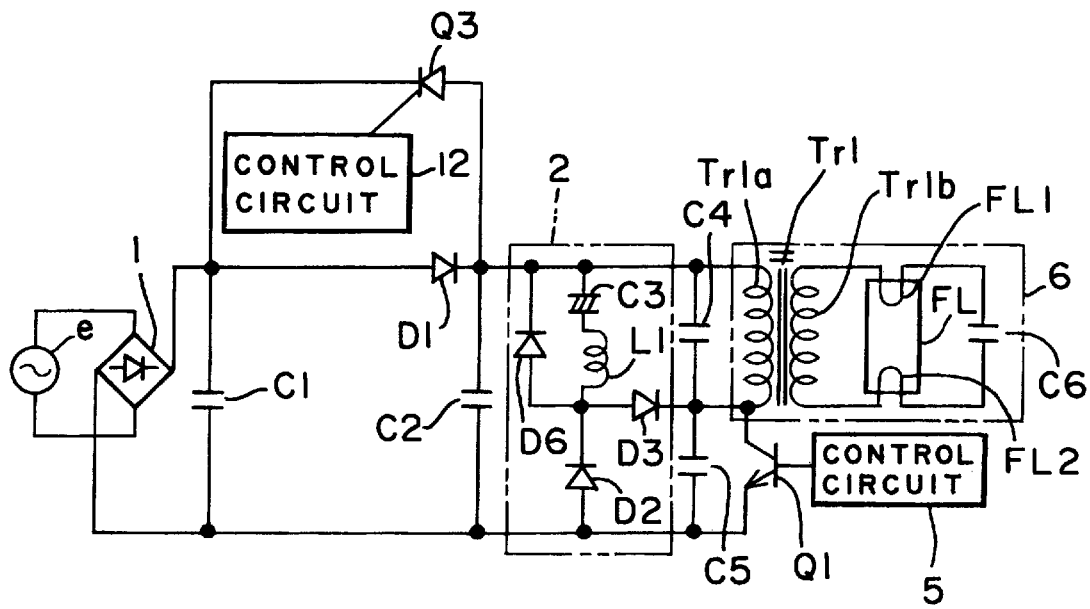
FIG. 12 is a circuit diagram of a discharge lamp lighting device according to a 10th embodiment of the present invention.

Referring now to FIG. 12, there is shown a discharge lamp lighting device according to the tenth embodiment of the invention. The tenth embodiment is similar to the sixth embodiment of FIG. 7, except for the addition of a diode D6 connected across the series combination of capacitor C3 and inductor L1. A thyristor Q3 serving as a short-circuiting means is connected antiparallel with the diode D1 and that a control circuit 12 is connected to a gate of the thyristor Q3.

The same effect can be achieved by adding the above configuration to the eighth embodiment.

As is true in the fifth embodiment, the thyristor Q3, serving as a short-circuiting means, is connected antiparallel with the diode D1. The control circuit 12 is connected to a gate of the thyristor Q3.

The same effect can be achieved by adding the above configuration to the thirteenth embodiment.

The embodiments of FIGS. 13, 14, 15, 16 and 17 are similar to the embodiments of FIGS. 1, 4, 5, 6 and 7, except that transformer Tr1 is replaced with a parallel inductor L3, a series inductor L4 and a transformer Tr2. The circuits function in the same way.

Figure 13:
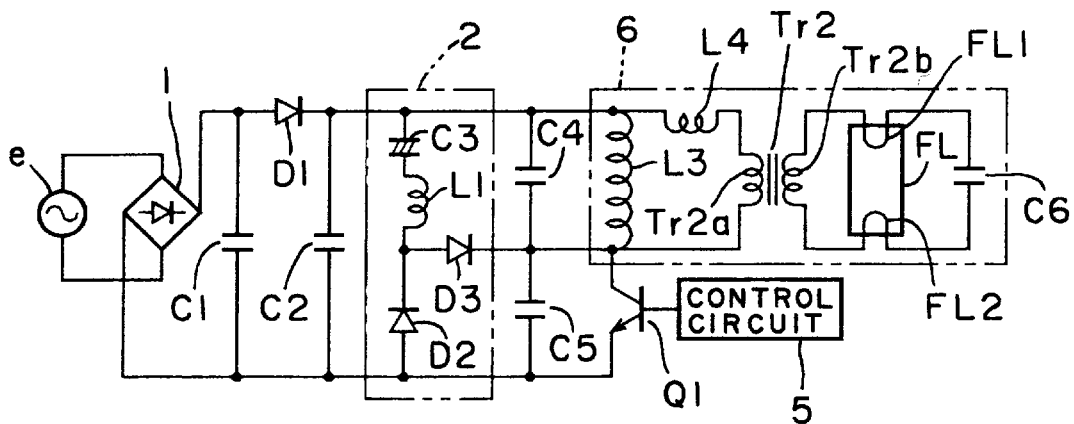
FIG. 13 in a circuit diagram of a discharge lamp lighting device according to an 11th embodiment of the present invention.
Figure 18:
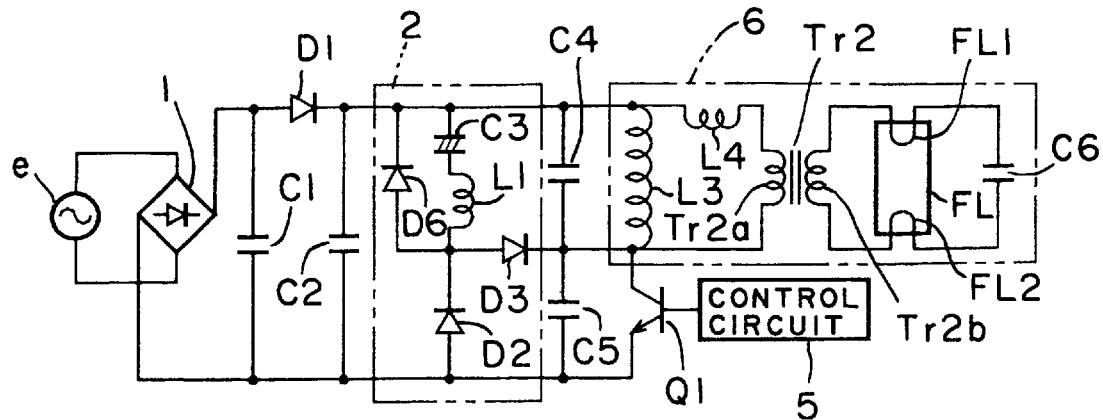
FIG. 18 is a circuit diagram of a discharge lamp lighting device according to a 16th embodiment of the present invention.

Referring now to FIG. 18, a discharge lamp lighting device according to the 16th embodiment of the present invention is similar to the embodiment of FIG. 13, except for the addition of a diode D6 connected across the series combination of capacitor C3 and inductor L1.

Figure 14:
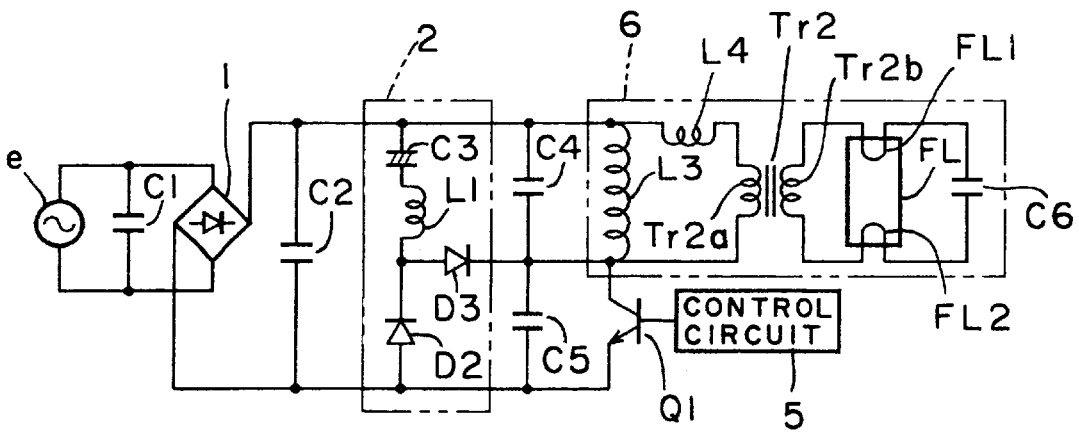
FIG. 14 is a circuit diagram of a discharge lamp lighting device according to a 12th embodiment of the present invention.
Figure 19:
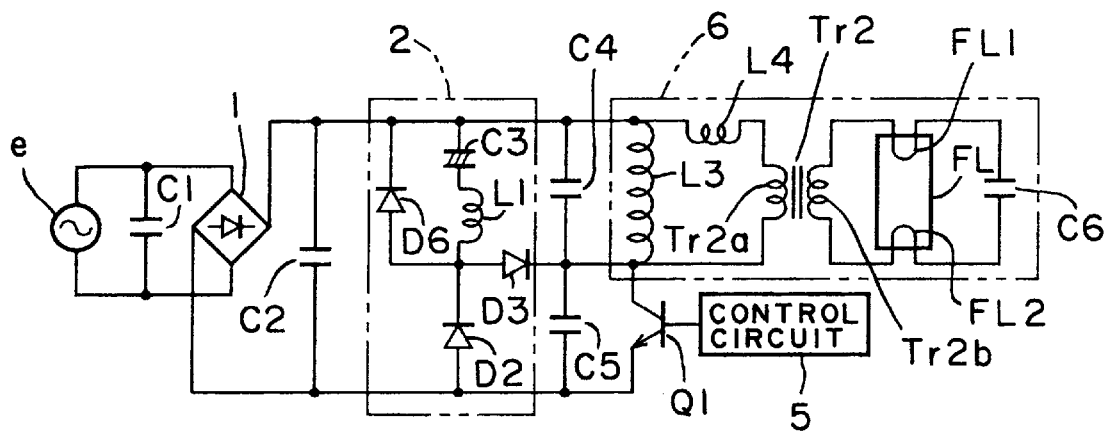
FIG. 19 is a circuit diagram of a discharge lamp lighting device according to a 17th embodiment of the present invention.

Referring now to FIG. 19, a discharge lamp lighting device according to a 17th embodiment of the present invention is similar to the of the invention in FIG. 14, except for the addition of a diode D6 connected across the series combination of capacitor C3 and inductor L1.

Figure 15:
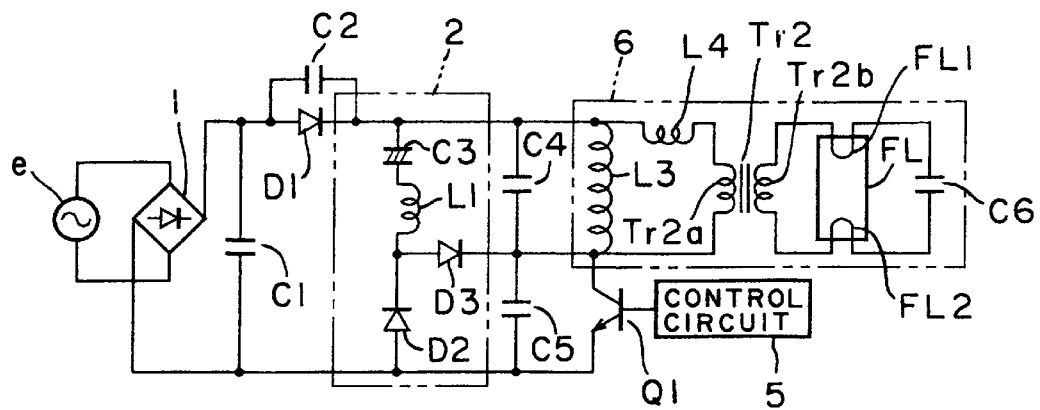
FIG. 15 is a circuit diagram of a discharge lamp lighting device according to a 13th embodiment of the present invention.
Figure 20:
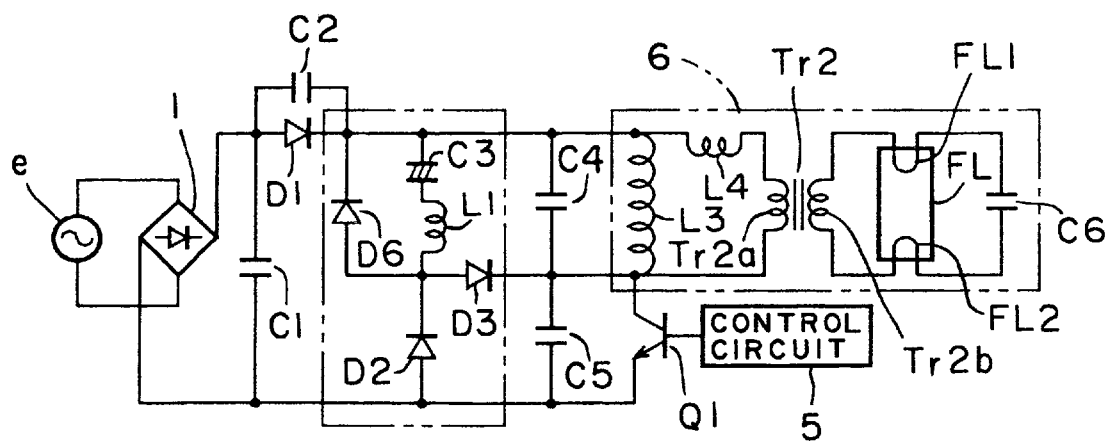
FIG. 20 is a circuit diagram of a discharge lamp lighting device according to an lath embodiment of the present invention.
Figure 21:
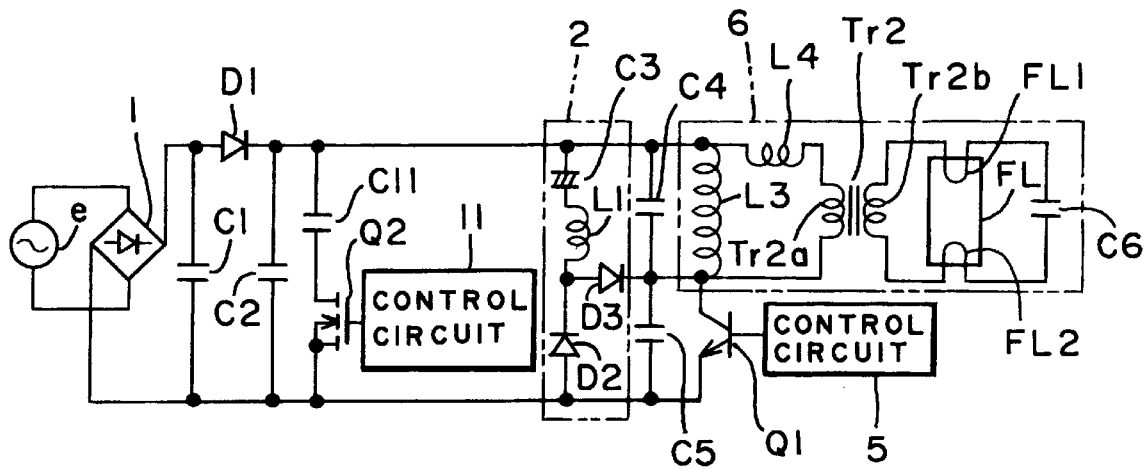
FIG. 21 is a circuit diagram of a discharge lamp lighting device according to a 19th embodiment of the present invention.

Referring now to FIG. 20, a discharge lamp lighting device according to an 18th embodiment of the present invention is similar to the embodiment of FIG. 15, except for the addition of a diode D6 connected across the series combination of capacitor C3 and inductor L1.

Figure 23:
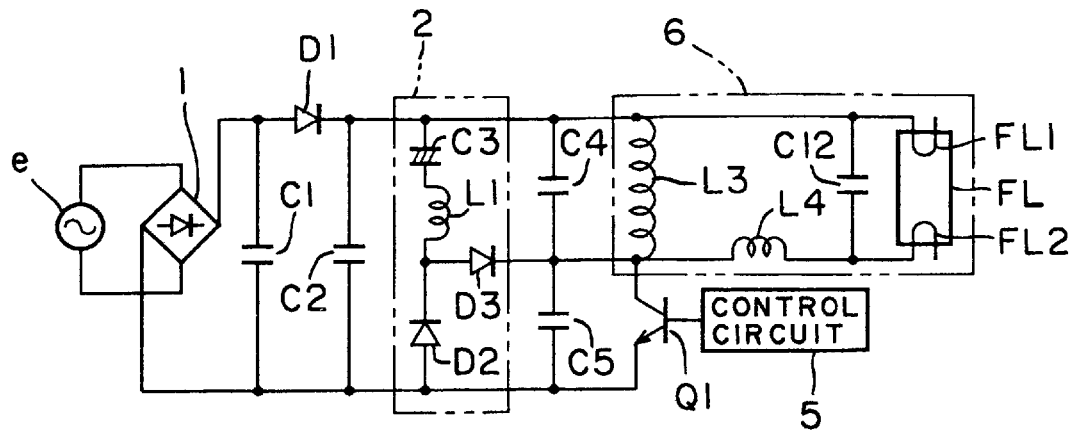
FIG. 23 is a circuit diagram of a discharge lamp lighting device according to a 21st embodiment of the present invention.

Referring now to FIG. 23, a discharge lamp lighting device according to the 21st embodiment of the present invention is similar to the embodiment of FIG. 13, except that insulated type transformer Tr2 and capacitor C6 are omitted, and a starting capacitor C12 is connected across one side of the filaments FL1, FL2 of the fluorescent lamp FL. The other terminals of the filaments FL1, FL2 are left open.

Figure 24:
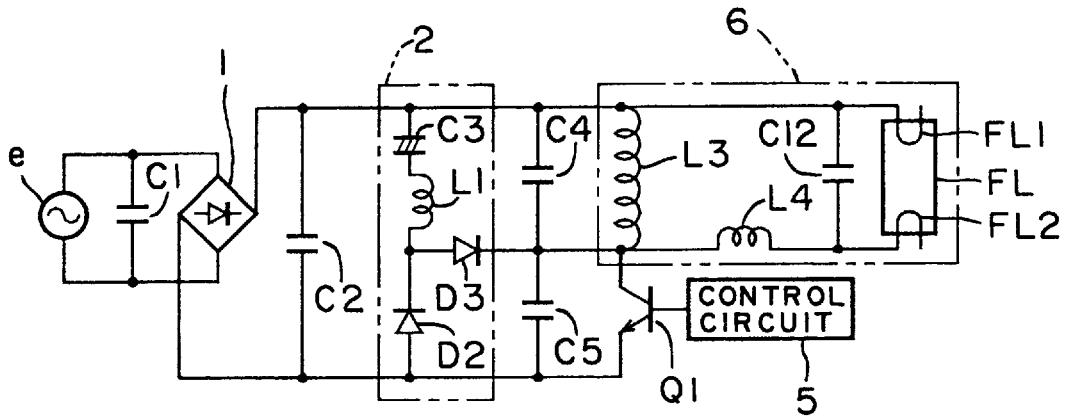
FIG. 24 is a circuit diagram of a discharge lamp lighting device according to a 22nd embodiment of the present invention.

Referring now to FIG. 24, a discharge lamp lighting device according to the 22nd embodiment is similar to the embodiment of FIG. 14, except for the omission of the insulated type transformer Tr2 and capacitor C6, and the addition of starting capacitor C12, as in the embodiment of FIG. 23.

Figure 25:
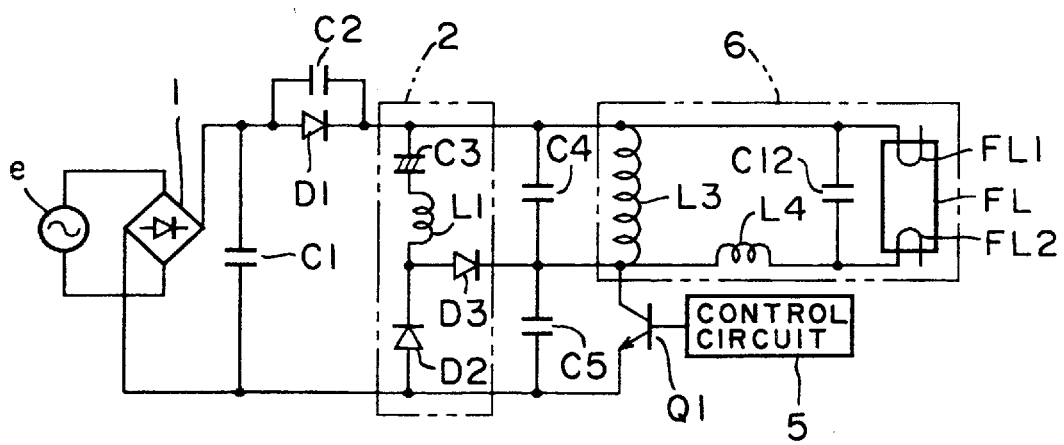
FIG. 25 is a circuit diagram of a discharge lamp lighting device according to a 23rd embodiment of the present invention.

Referring now to FIG. 25 a discharge lamp lighting device according to the 23rd embodiment of the present invention is similar to the embodiment of FIG. 15, except for the omission of the insulated type transformer Tr2 and capacitor C6, and the addition of starting capacitor C12, as in the embodiment of FIG. 23.

With the configuration as above, their basic functions are the same as those according to the 16th, 17th and 18th embodiments except that preheating of the filaments FL1, FL2 is not possible.

Figure 16:
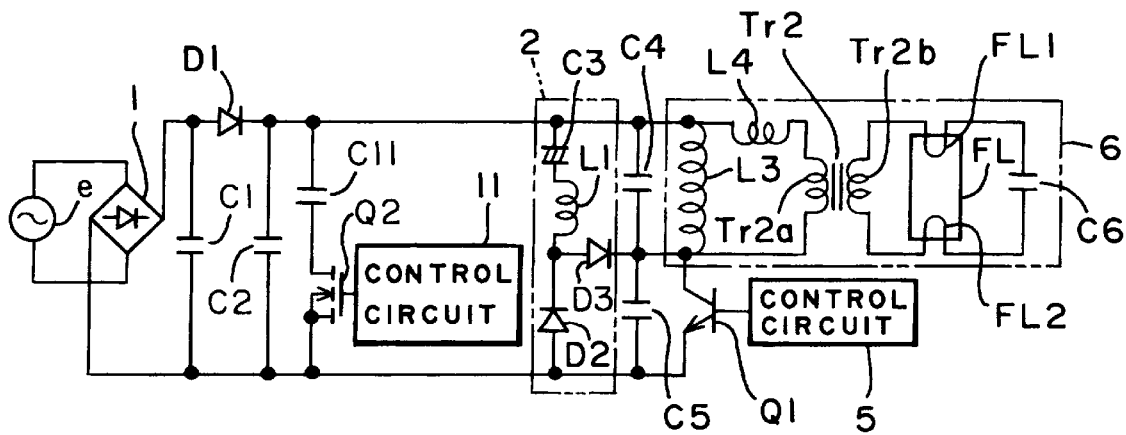
FIG. 16 is a circuit diagram of a discharge lamp lighting device according to a 14th embodiment of the present invention.

Referring now to FIG. 26 a discharge lamp lighting device according to a 24th embodiment of the present invention is similar to the embodiment of FIG. 16, except for the omission of the insulated type transformer Tr2 and capacitor C6, and the addition of starting capacitor C12, as in the embodiment of FIG. 23. This embodiment functions the same as the fourth embodiment, except that preheating of the filaments FL1, FL2 is not supported.

The same effect can be achieved by adding the above configuration to the 22nd embodiment or the 23rd embodiment.

Figure 17:
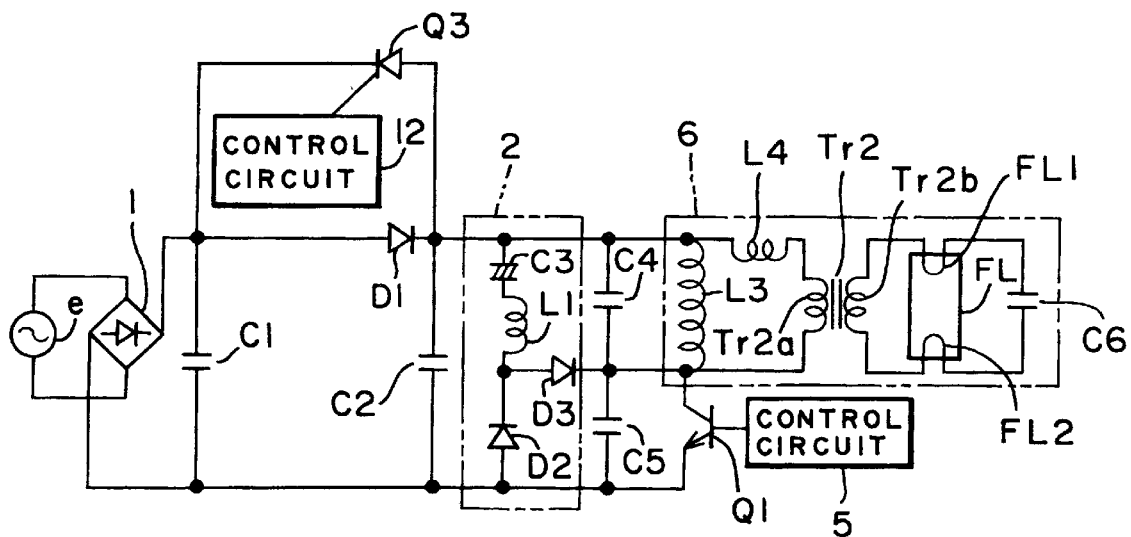
FIG. 17 is a circuit diagram of a discharge lamp lighting device according to a 15th embodiment of the present invention.

Referring now to FIG. 27, a discharge lamp lighting device according to a 25th embodiment of the present invention is similar to the embodiment of FIG. 17, except for the omission of the insulated type transformer Tr2 and capacitor C6, and the addition of starting capacitor C12, as in the embodiment of FIG. 23.

The same effect can be achieved by adding the above configuration to the 23rd embodiment.

Figure 28:
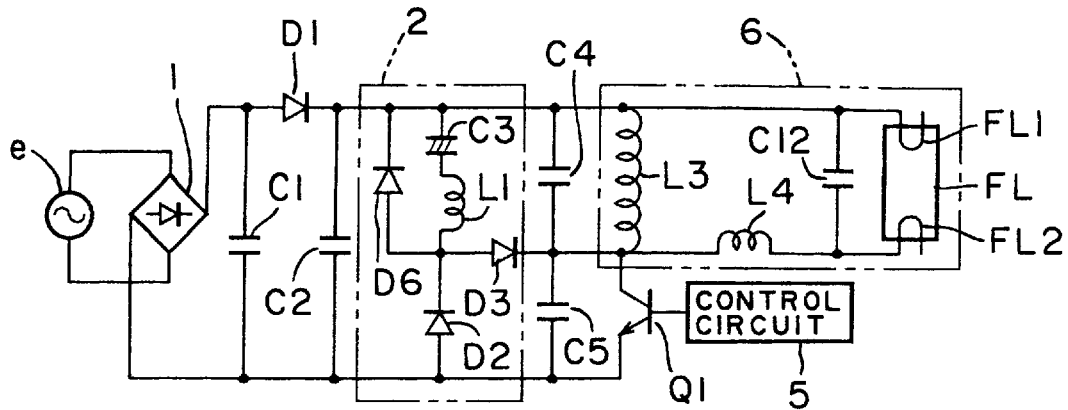
FIG. 28 is a circuit diagram of a discharge lamp lighting device according to a 26th embodiment of the present invention.

Referring now to FIG. 28, a discharge lamp lighting device according to a 26th embodiment of the present invention is similar to the embodiment of FIG. 18, except for the omission of the insulated type transformer Tr2 and capacitor C6, and the addition of starting capacitor C12, as in the embodiment of FIG. 23.

Figure 29:
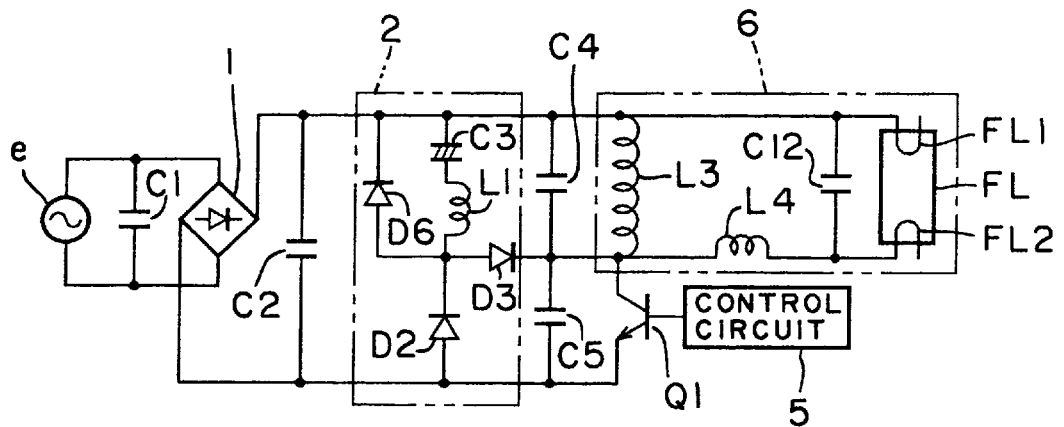
FIG. 29 is a circuit diagram of a discharge lamp lighting device according to a 27th embodiment of the present invention.

Referring nor to FIG. 29, a discharge lamp lighting device according to a 27th embodiment of the present invention is similar to the embodiment of FIG. 19, except for the omission of the insulated type transformer Tr2 and capacitor C6, and the addition of starting capacitor C12, as in the embodiment of FIG. 23.

Figure 30:
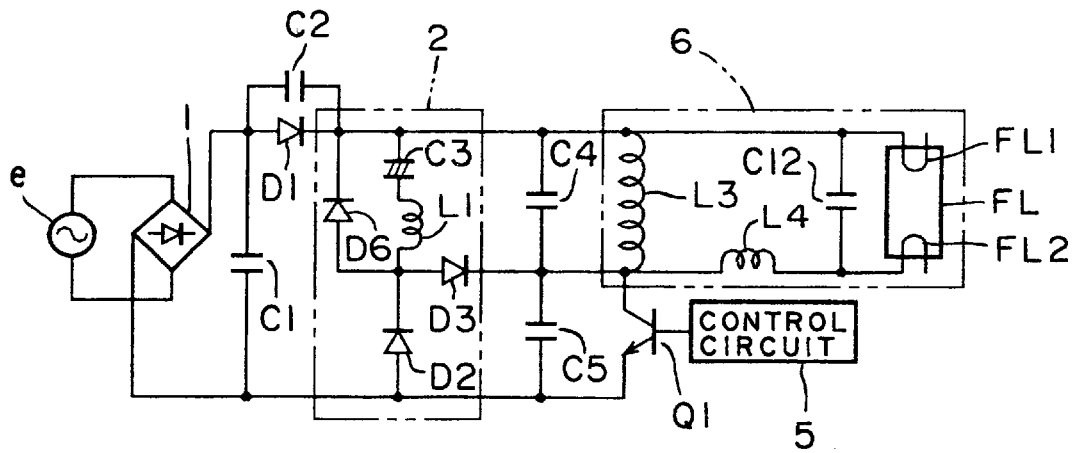
FIG. 30 is a circuit diagram of a discharge lamp lighting device according to an 28th embodiment of the present invention.

Referring now to FIG. 30, a discharge lamp lighting device according to a 28th embodiment of the present invention is similar to the embodiment of FIG. 20, except for the omission of the insulated type transformer Tr2 and capacitor C6, and the addition of starting capacitor C12, as in the embodiment of FIG. 23.

Figure 31:
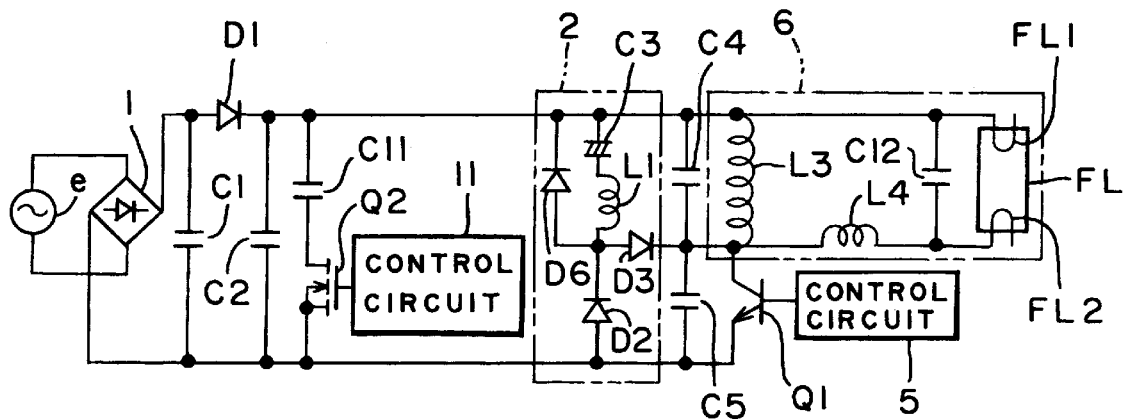
FIG. 31 is a circuit diagram of a discharge lamp lighting device according to a 29th embodiment of the present invention.

Referring now to FIG. 31, a discharge lamp lighting device according to a 29th embodiment of the present invention is similar to the embodiment of FIG. 20, except for the omission of the insulated type transformer Tr2 and capacitor C6, and the addition of starting capacitor C12, as in the embodiment of FIG. 23.

Figure 22:
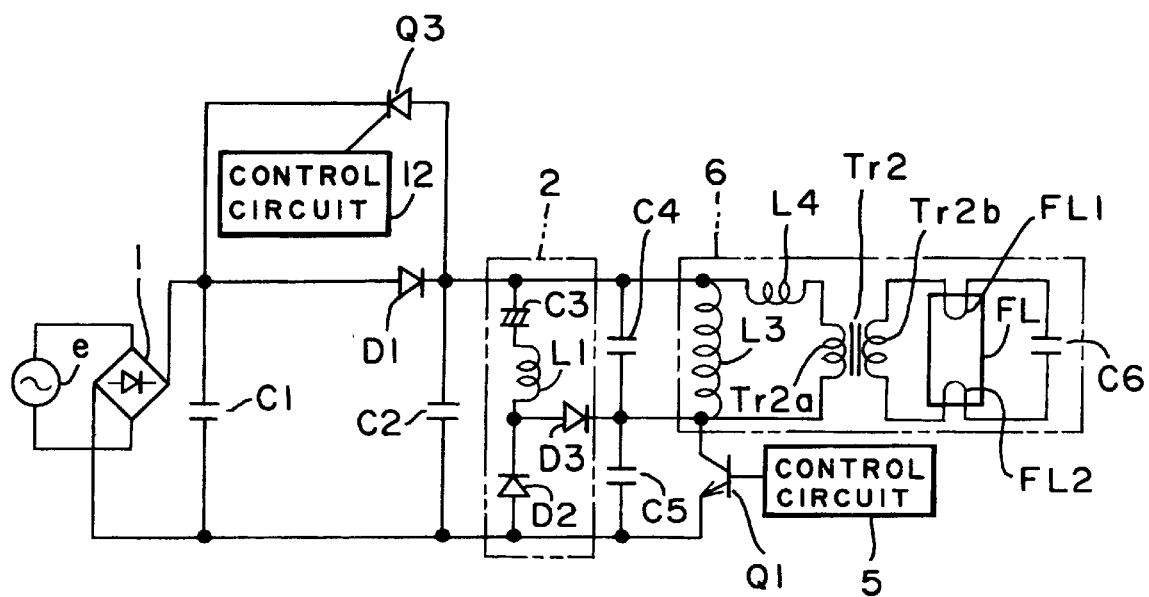
FIG. 22 is a circuit diagram of a discharge lamp lighting device according to a 20th embodiment of the present invention.
Figure 32:
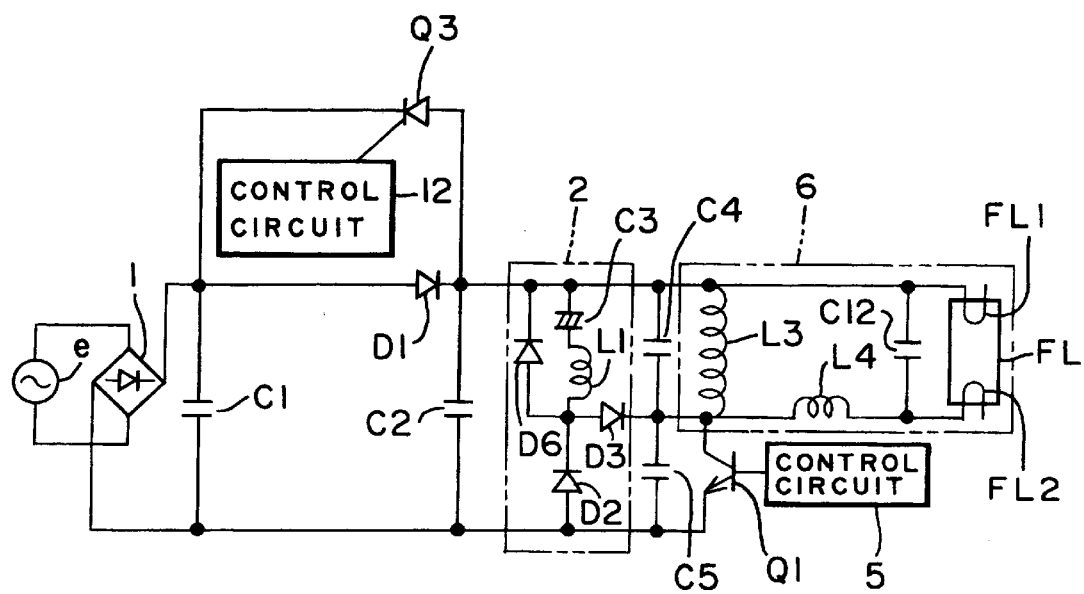
FIG. 32 is a circuit diagram of a discharge lamp lighting device according to a 30th embodiment of the present invention.

Referring now to FIG. 32, a discharge lamp lighting device according to a 30th embodiment is similar to the embodiment of FIG. 22 except for the omission of the insulated type transformer Tr2 and capacitor C6, and the addition of starting capacitor C12, as in the embodiment of FIG. 23.

Further, the same effect can be achieved by adding the above configuration to the 28th embodiment.

Next, load circuits 6 according to the 31st through the 40th embodiments of the invention are explained referring to FIGS. 33 through 42.

Figure 33:
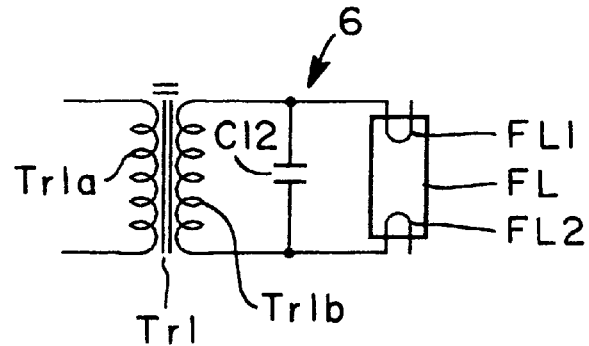
FIG. 33 is a circuit diagram of a load circuit according to a 31st embodiment of the present invention.

FIG. 33 is a circuit diagram of a load circuit according to the 31st embodiment of the present invention.

Figure 34:
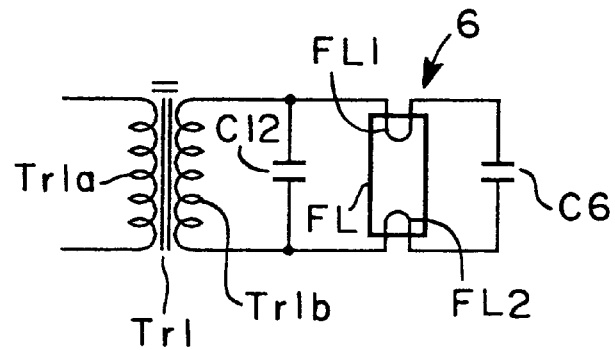
FIG. 34 is a circuit diagram of a load circuit according to a 32nd embodiment of the present invention.

FIG. 34 is a circuit diagram of a load circuit according to the 32nd embodiment of the present invention.

Figure 35:
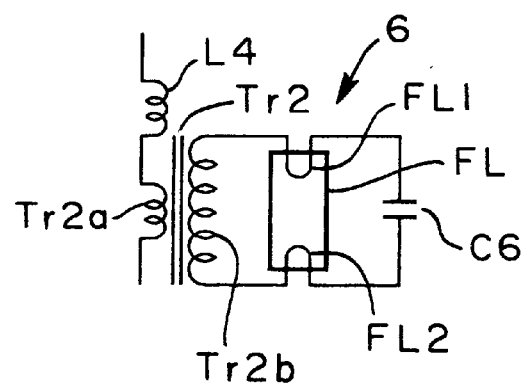
FIG. 35 is a circuit diagram of a load circuit according to a 33rd embodiment of the present invention.

FIG. 35 is a circuit diagram of a load circuit according to the 33rd embodiment of the present invention.

Figure 36:
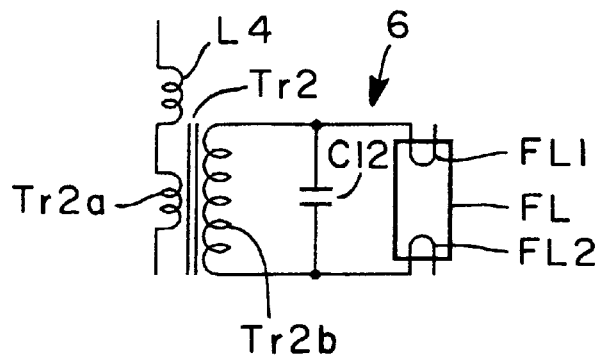
FIG. 36 is a circuit diagram of a load circuit according to a 34th embodiment of the present invention.

FIG. 36 is a circuit diagram of a load circuit according to the 34th embodiment of the present invention.

Figure 37:
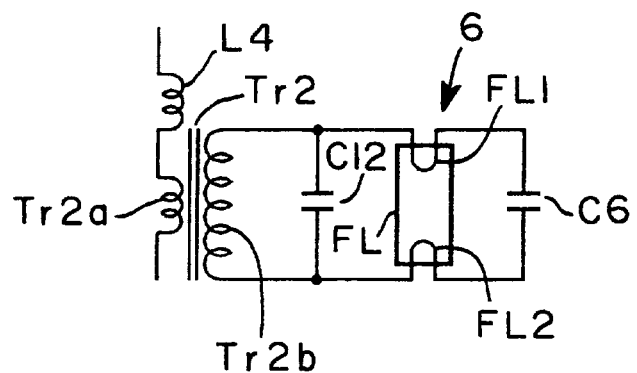
FIG. 37 is a circuit diagram of a load circuit according to a 35th embodiment of the present invention.

FIG. 37 is a circuit diagram of a load circuit according to the 35th embodiment of the present invention.

Figure 38:
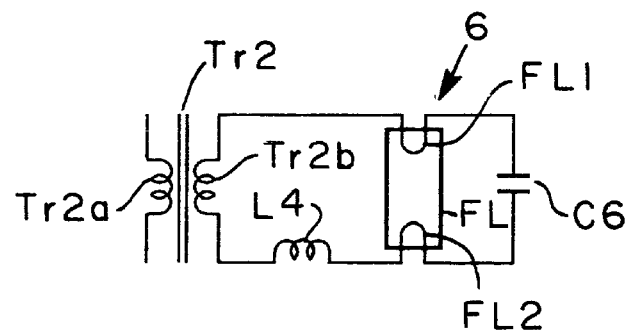
FIG. 38 is a circuit diagram of a load circuit according to a 36th embodiment of the present invention.

FIG. 38 is a circuit diagram of a load circuit according to the 36th embodiment of the present invention.

Figure 39:
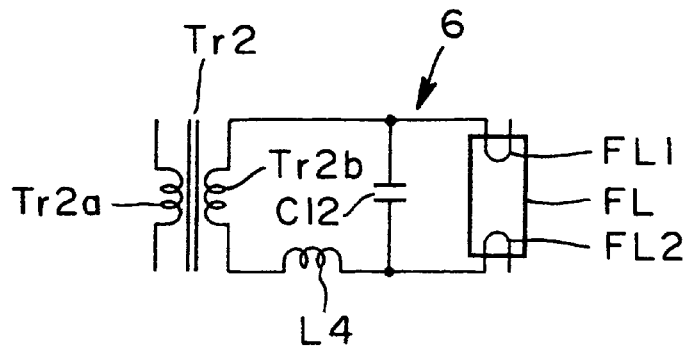
FIG. 39 is a circuit diagram of a load circuit according to a 37th embodiment of the present invention.

FIG. 39 is a circuit diagram of a load circuit according to the 37th embodiment of the present invention.

Figure 40:
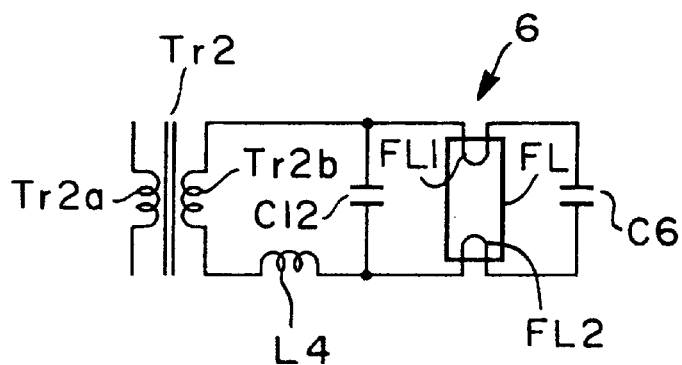
FIG. 40 is a circuit diagram of a load circuit according to a 38th embodiment of the present invention.

FIG. 40 is a circuit diagram of a load circuit according to the 38th embodiment of the present invention.

Figure 41:
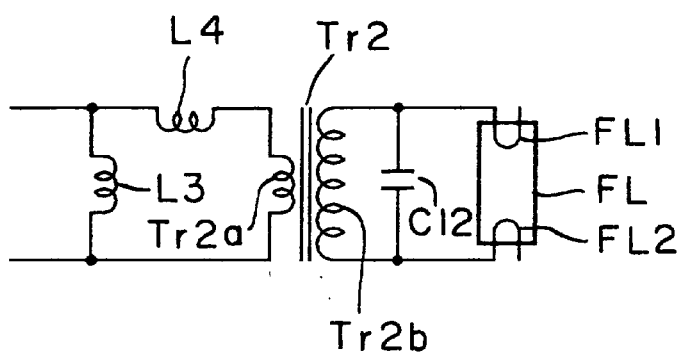
FIG. 41 is a circuit diagram of a load circuit according to a 39th embodiment of the present invention.

FIG. 41 is a circuit diagram of a load circuit according to the 39th embodiment of the present invention.

Figure 42:
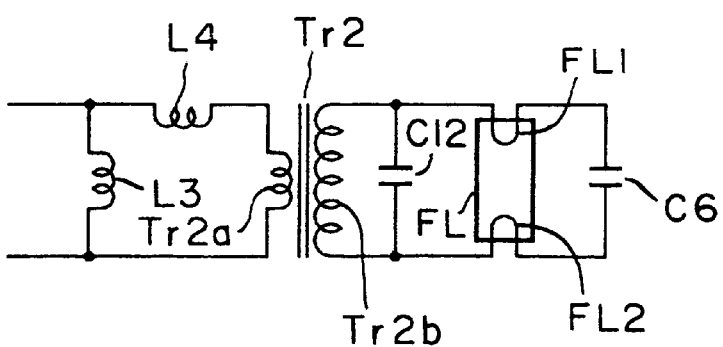
FIG. 42 is a circuit diagram of a load circuit according to a 40th embodiment of the present invention.

FIG. 42 is a circuit diagram of a load circuit according to the 40th embodiment of the present invention.

A load circuit 6 according to any one of the 31st through the 40th embodiments of the invention can be used in any of the discharge lamp lighting devices shown in the first to the 30th embodiments.

In FIG. 33, a load circuit 6 according to the 31st embodiment of the invention includes a secondary winding Tr1b of a leakage flux type inverter transformer Tr1, to which a starting capacitor C12 and an end of the combination of the filaments FL1, FL2 of the fluorescent lamp FL are connected.

In FIG. 34, a load circuit 6 according to the 32nd embodiment of the invention, a preheating capacitor C6 is connected to the other end of the combination of the filaments FL1, FL2 of the fluorescent lamp FL of a load circuit 6.

In FIG. 35. a load circuit 6 according to the 33rd embodiment of the invention, is connected to a primary winding Tr2a of an insulated type transformer Tr2 through a ballast L4. An end of the combination of the filaments FL1, FL2 of the fluorescent lamp FL is connected to a secondary winding Tr2b of the transformer Tr2; and a capacitor C6 is connected to the other end of the combination of the filaments FL1, FL2.

In FIG. 36, a load circuit 6 according to the 34th embodiment is a load circuit as described in the 33rd embodiment, except that a capacitor C12 is connected to the secondary winding Tr2b of the transformer Tr2 and the capacitor C6 is omitted.

In FIG. 37, a load circuit 6 according to the 35th embodiment is a load circuit as described in the 34th embodiment of FIG. 36, except that a capacitor C6 is disposed between and connected to the other ends of the respective filaments FL1, FL2 of the fluorescent lamp FL.

In FIG. 38, a load circuit 6 according to the 36th embodiment of the invention, includes a secondary winding Tr2b of an insulated type transformer Tr2 connected through a ballast L4 to one end of the combination of the filaments FL1, FL2 of the fluorescent lamp FL. A capacitor C6 is connected to the other end of the filaments FL1, FL2.

In FIG. 39, a load circuit 6 according to the 37th embodiment of the invention, substitutes for the capacitor C6 of the load circuit 6 according to the 36th embodiment of the invention, a capacitor C12 connected to the one end of the combination of the filaments FL1, FL2. The other end of the filaments FL1, FL1 is open.

In FIG. 40, a load circuit 6 according to the 38th embodiment of the invention, includes a capacitor C6 connected to the other end of the combination of the filaments FL1, FL2 of the load circuit 6 according to the 37th embodiment.

In FIG. 41, a load circuit according to the 39th embodiment of the invention, includes a ballast L4 and a primary winding Tr2a of an insulated type transformer Tr2 connected to a resonant inductor L3. A secondary winding Tr2b of the transformer Tr2 is connected to a capacitor C12 and to one end of the combination of the filaments FL1, FL2 of the fluorescent light FL.

In FIG. 42, a load circuit 6 according to the 40th embodiment of the invention, includes a capacitor C6 connected to the other end of the combination of the filaments FL1, FL2 of the load circuit 6 according to the 39th embodiment.

Figure 43:
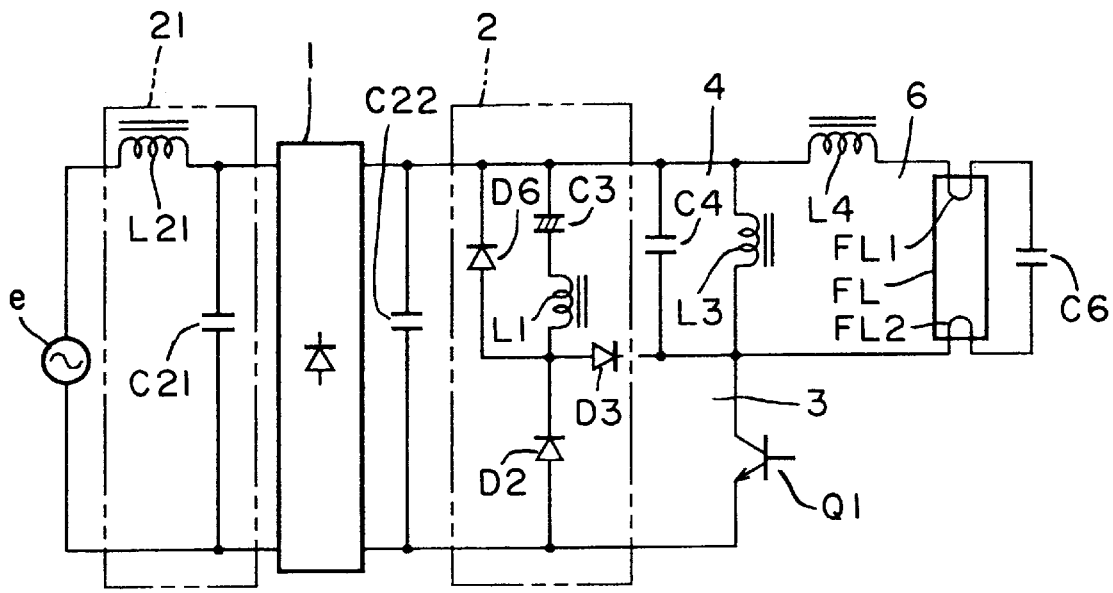
FIG. 43 is a circuit diagram of a discharge lamp lighting device according to a 41st embodiment of the present invention.

Referring now to FIG. 43, a discharge lamp lighting device according to a 41st embodiment of the invention, interposes a low pass filter 21 consisting of an inductor L21 and a between the commercial AC power supply e and the input terminal of a full-wave rectifying circuit 1. The low pass filter 21 removes harmonics from the output of the low pass filter 21. A capacitor C22 connected across the output of the full-wave rectifying circuit further removes harmonics from the output terminal of the full-wave rectifying circuit 1.

The capacitor C22 is also connected to a partially smoothed circuit 2, which includes a series circuit consisting of a charge capacitor C3, an inductor L1 and a first diode D2. Also included in the partially smoothed circuit 2 are a second diode D3 and a third diode D6. The second diode D3 connected to the connecting point of the inductor L1 and the first diode D2, and the third diode D6 connected in parallel with a series circuit consisting of the inductor L1 and the charge capacitor C3.

An inverter circuit 3 is connected to the partially smoothed circuit 2. Inverter circuit 3 includes a parallel resonance circuit 4 and a collector-emitter of a transistor Q1 that serves as a switching element. The parallel resonance circuit 4 consists of a resonance inductor L3 in parallel with a first resonance capacitor C4. A control circuit (not shown) is connected to the base of the transistor Q1.

Filaments FL1, FL2 of a fluorescent lamp LF serving as a discharge lamp are connected through a ballast L4 to the resonance inductor L3. A starting capacitor C6 is connected to the outboard elements of the filaments FL1, FL2.

Other types of load circuits 6, containing other or different elements may be used with the fluorescent lamp FL.

Figure 44:
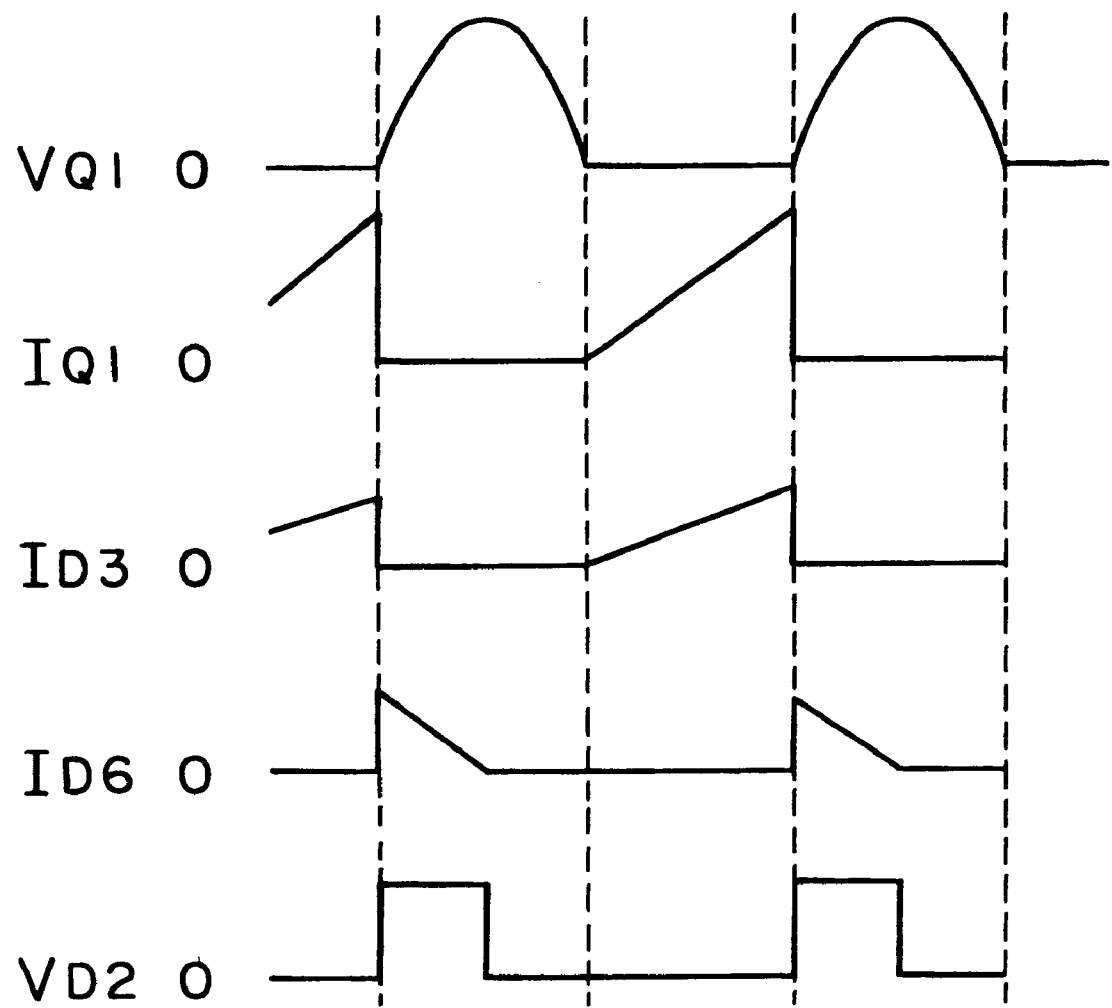
FIG. 44 is a waveform illustration showing the junction of the discharge lamp lighting device according to the 41st embodiment of the present invention.

Referring now to FIGS. 43 and 44, when the inverter circuit 3 is actuated to oscillate upon on/off switching of the transistor Q1, resonance of the resonance inductor L3 and the resonance capacitor C4 generates a high frequency voltage, thereby inducing a high frequency voltage in the resonance capacitor Ci When the transistor Q1 of the inverter circuit 3 is switched on in an arbitrary time period in the range where the voltage of the pulsating current in the full-wave rectifying circuit 1 is higher than the charge voltage of the charge capacitor C3, electric current flows along the path consisting of the charge capacitor C3, the inductor L21, the second diode D3, the transistor Q1 and the full-wave rectifying circuit 1 so that the charge capacitor C3 is charged. As a result, charge current ID3 flows into the second diode D3. In the high-voltage range of the full-wave rectifying circuit 1, there is no discharge of current from the changing capacitor C3 to the inverter circuit 3. When the transistor Q1 is switched off, the magnetic energy stored in the inductor L21 permits current to continue to flow into the inductor L21. Therefore, electric current ID6 for charging the charge capacitor C3 flows along the path consisting of the charge capacitor C3, the inductor L21 and the third diode D6.

When the third diode D6 in the 'on' state, a voltage whose value is produced by subtracting the voltage charged on the charge capacitor C3 from the voltage at both ends of the capacitor C22 is applied to the first diode D2. Thus a voltage having the same waveform as the voltage VD2 as shown in FIG. 44 is applied to the first diode D2. Since the amount of the current flowing into the second diode D3 is thus reduced by the third diode D6, the elements can be made compact according to the above configuration In an arbitrary time period in the range where the voltage of the pulsating current in the full-wave rectifying circuit 1 is lower than the voltage charged on the charge capacitor C3, discharge from the charge capacitor C3 causes the inverter circuit 3 to function.

Figure 45:
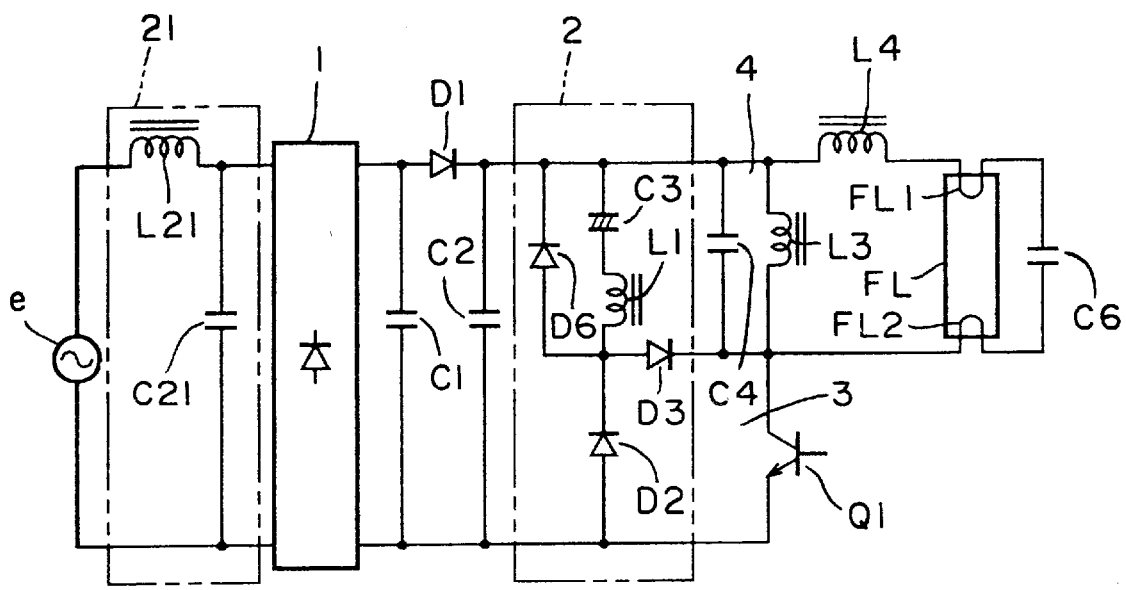
FIG. 45 is a circuit diagram of a discharge lamp lighting device according to a 42nd embodiment of the present invention.
Figure 46:
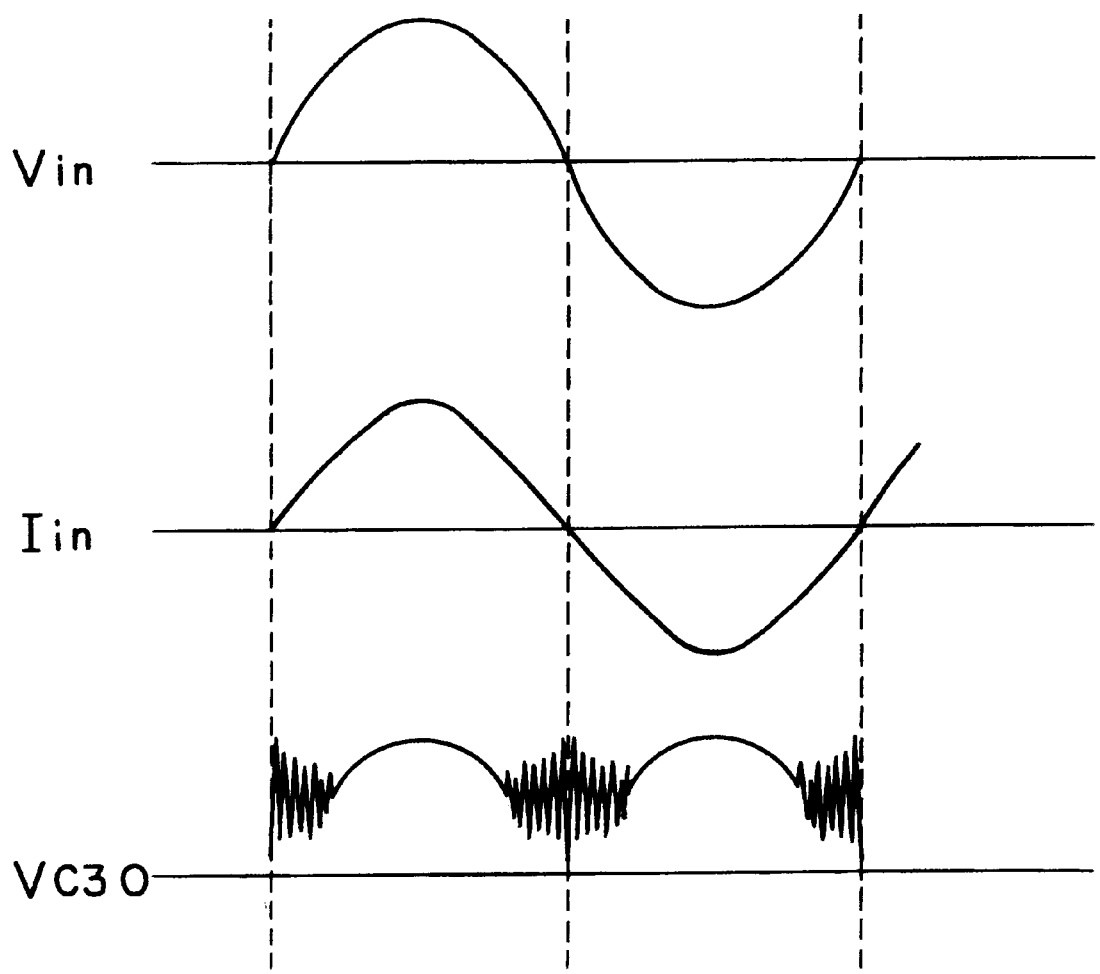
FIG. 46 is a waveform illustration showing the function of the discharge lamp lighting device according to the 42nd embodiment of the present invention.

Referring now to FIGS. 45 and 46, a discharge lamp lighting device according to the 42nd embodiment of the invention, has the same configuration as the 41st embodiment except that, instead of a capacitor C22, a first capacitor C1 having a relatively large capacitance is included in parallel with a series circuit consisting of a diode D1 and a second capacitor C2. Second capacitor C2 has a capacitance smaller than that of the first capacitor C1.

When the inverter circuit 3 is actuated to oscillate as a result of the on/off switching of the transistor Q1, resonance between the resonance capacitor C4 and the resonance inductor L3 generates a high frequency voltage, thereby inducing a high frequency voltage on the resonance inductor L3

When the transistor Q1 is switched on, electric current flows to the resonance inductor L3 while electric current also flows through the charge capacitor C3, the inductor L1 and the diode D3, thereby charging the charge capacitor C3. The device stores in the charge capacitor C3 a DC voltage lower than the peak voltage of the pulsating current from the full-wave rectifying circuit 1.

When the voltage of the pulsating current from the full-wave rectifying circuit 1 is higher than the charge voltage of the charge capacitor C3, when the transistor Q1 of the inverter circuit 3 is switched on in an arbitrary time period in the range where the voltage of the pulsating current in the full-wave rectifying circuit 1 is higher than the charge voltage of the charge capacitor C3, electric current is supplied to the resonance inductor L3 mainly from the first capacitor C1 and partly from the second capacitor C2. The combined capacitance of the first and second capacitor C1, C2 is sufficient to provide the energy required by the inverter circuit 3. Energy corresponding to the current supplied from the first capacitor C1 and the second capacitor C2 flows in the form of input current from the commercial AC power supply e. In accordance with changes in voltage of the pulsating current, the device accommodated switching actions of the transistor Q1 so that, along with an increase in value of AC voltage sinusoidal waves the slight and uniform amplitude of high frequency waves produced by the inverting action of the inverter circuit 3 is superimposed over the entire range where the voltage on the full-wave rectifying circuit 1 is high.

In the range where the voltage on the full-wave rectifying circuit 1 is high, the combined value of respective voltages on the first capacitor C1 and the second capacitor C2 corresponds to the energy supplied by the pulsating current voltage, thereby satisfying the energy required by the inverter circuit 3.

Therefore, both the first and second capacitors C1, C2 produce only minimal ripples and heat and are ensured to more reliably function.

When the voltage on the full-wave rectifying circuit 1 is high, the charge capacitor C3 is charged during the period when the transistor Q1 is on. In the high-voltage range of the full-wave rectifying circuit 1, there is no discharge of current from the changing capacitor C3 to the inverter circuit 3. To explain it in more detail, when the transistor Q1 is switched on, electric current flows along the path consisting of the charge capacitor C3, the inductor L1, the second diode D3 and the transistor Q1 so that the charge capacitor C3 is charged. When the transistor Q1 is switched off, the magnetic energy stored in the inductor L1 permits current to continue to flow into the inductor L1. Therefore, electric current for charging the charge capacitor C3 flows along the path consisting of the charge capacitor C3, the inductor L1 and the third diode D6. When the third diode D6 is in the 'on' state, a voltage, whose value is produced by subtracting the voltage charged on the charge capacitor C3 from the voltage at both ends of the capacitor C2, is applied to the first diode D2. Accordingly, a voltage having the same waveform as the voltage VD2 is applied to the first diode D2. Since current flowing into the second diode D3 is thus reduced by the third diode D6, the elements can be made compact according to the above configuration.

When the instantaneous voltage on the full-wave rectifying circuit 1 is low, when the transistor Q1 is turned on at the beginning of a decrease in the pulsating sinusoidal voltage in the full-wave rectifying circuit 1 with respect to the voltage charged on the charge capacitor C3, the electric current to the inverter circuit 3 is supplied from the second capacitor C2 at first so that electric current flows along the path consisting of the second capacitor C2, the resonance inductor L3 and the transistor Q1 as well as along the path consisting of the ballast L4, the fluorescent lamp FL and the transistor Q1. At that time, the voltage on the second capacitor C2 decreases with the increasing current flowing through the transistor Q1. When the voltage on the second capacitor C2 becomes lower than the output voltage of the full-wave rectifying circuit 1, in other words, lower than the voltage on the first capacitor C1, the current to the inverter circuit 3 flows to the first capacitor C1, the resonance inductor L3 and the transistor Q1.

Figure 47:
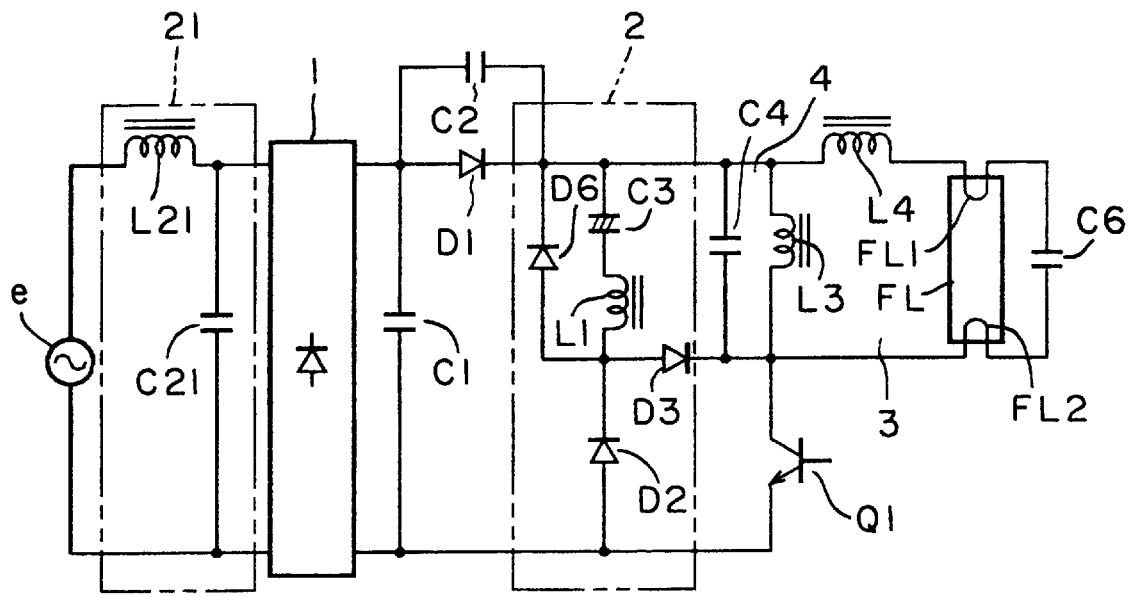
FIG. 47 is a circuit diagram of a discharge lamp lighting device according to a 43rd embodiment of the present invention.
Figure 48:
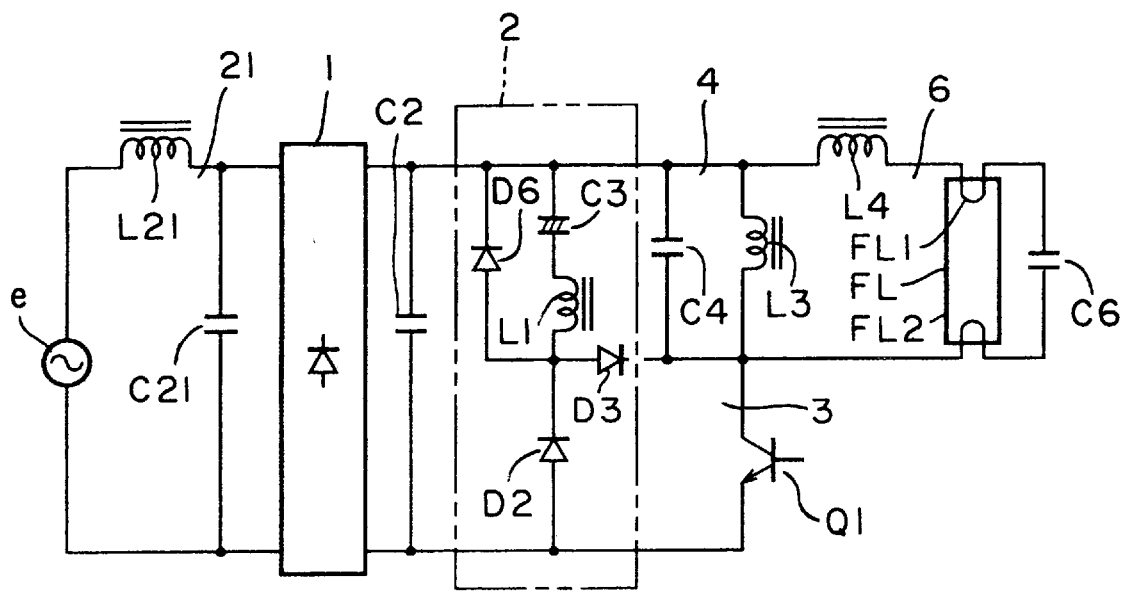
FIG. 48 is a circuit diagram of a discharge lamp lighting device according to a 44th embodiment or the present invention.

Meanwhile, due to a transient impedance of the inductor L1, the voltage charged on the charge capacitor C3 delays discharging energy so that energy discharge is done just before the transistor Q1 is switched off. When the transistor Q1 is switched off, the charging voltage on the inductor L21 becomes the source of power supply, and current flows along the path consisting of the charge capacitor C3, the second capacitor C2 and the first diode D2, thereby discharging the second capacitor C2. As a result of the resonance between the inductor L1 and the second capacitor C2, the voltage on the charge capacitor C3 is superimposed over the resonance voltage, thereby producing a voltage waveform shown in FIG. 46, which is close to that of a DC voltage, with the voltage corresponding to the maximum instantaneous voltage of the commercial AC power supply e being approximately equal to the minimum instantaneous voltage When the voltage on the first capacitor C1 decreases with respect to the charge voltage on the charge capacitor C3, input current continues to flow in, because the diode D1 prevents the electric charge on the charge capacitor C3 from flowing into the first capacitor C1 so that current flows from the full-wave rectifying circuit 1. Since this current flows through the low pass filter 21, the input current waveform Iin approaches the input voltage waveform Vin as shown in FIG. 46. Thus, the device according to the present embodiment is capable of reducing high harmonics Referring now to FIG. 47, a discharge lamp lighting device according to the 43rd embodiment of the invention, has the same configuration as that of the 41st embodiment except that a second capacitor C2 is connected in parallel with the diode D1.

Referring now to 48, a discharge lamp lighting device according to a 44th embodiment of the invention, has the same configuration as that of the 42nd embodiment except that the diode D1 is omitted and the full-wave rectifying circuit is connected between the first capacitor C1 and the second capacitor C2.

By omitting the diode D2 as above, the structure of the circuit is simplified while maintaining the basic functions essentially unchanged.

Figure 49:
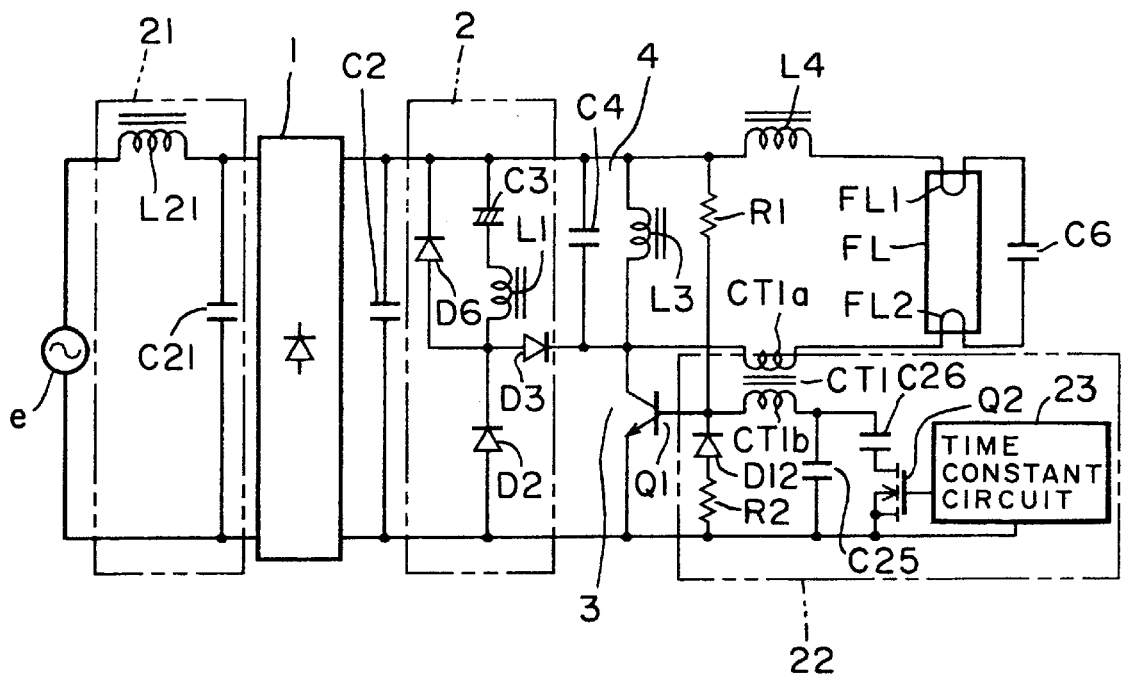
FIG. 49 is a circuit diagram of a discharge lamp lighting device according to a 45th embodiment of the present invention.

Referring now to FIG. 49, a discharge lamp lighting device according to the 45th embodiment of the invention, has the same configuration as that of the 41st embodiment except that a control circuit 22 is included. The control circuit 22 includes a starting resistance R1 connected to the base of the transistor Q1, and a detection winding CT1a of a current transformer CT1 connected between the resonance inductor L3 and the filament FL2 of the fluorescent lamp FL. An output winding CT1b of the current transformer CT1 is connected through a capacitor C25 between the base and the emitter of the transistor Q1. A series circuit consisting of a capacitor C26 and a field effect transistor Q2 is connected in parallel with the capacitor C25. A time constant circuit 23 is connected to the field effect transistor Q2. A series circuit consisting of a diode D12 and a resistance R2 is connected between the base and the emitter of the transistor Q1.

Next, the function of the 45th embodiment is explained hereunder. A device according to the 45th embodiment essentially functions in the same manner as the 41$^{st}$ embodiment.

According to the 45th embodiment described above, prior to actuation of the inverter circuit 3, the field effect transistor Q2 is turned off by the time constant circuit 23, thereby reducing the apparent combined capacitance of the capacitor C25 and the capacitor C26. This reduction in the apparent capacitance increases the oscillation frequency of the inverter circuit 3 so that the output of the inverter circuit 3 is reduced. After the charge on capacitor C3 is sufficiently increased, the field effect transistor Q2 is turned off. This increases the apparent combined capacitance of the capacitor C25 and the capacitor C26 so that the oscillation frequency of the inverter circuit 3 returns to its normal output level.

By actuating the inverter circuit 3 after the charge capacitor C3 is sufficiently charged as described above, a high peak current is prevented from flowing into the inductor L1, the second diode D3, the third diode DO and the transistor Q1. By thus protecting the transistor Q1 and other elements from stress, the embodiment enables the reduction of the sizes of those elements through reducing the capacity of withstanding voltage. Under normal circumstances, the capacitors C25, 26 ensure that the device functions without the danger of a decrease in efficiency.

Further, the same effect can be achieved by connecting a control circuit 22 to any one of the 42nd, 43rd and 44th embodiments.

Figure 50:
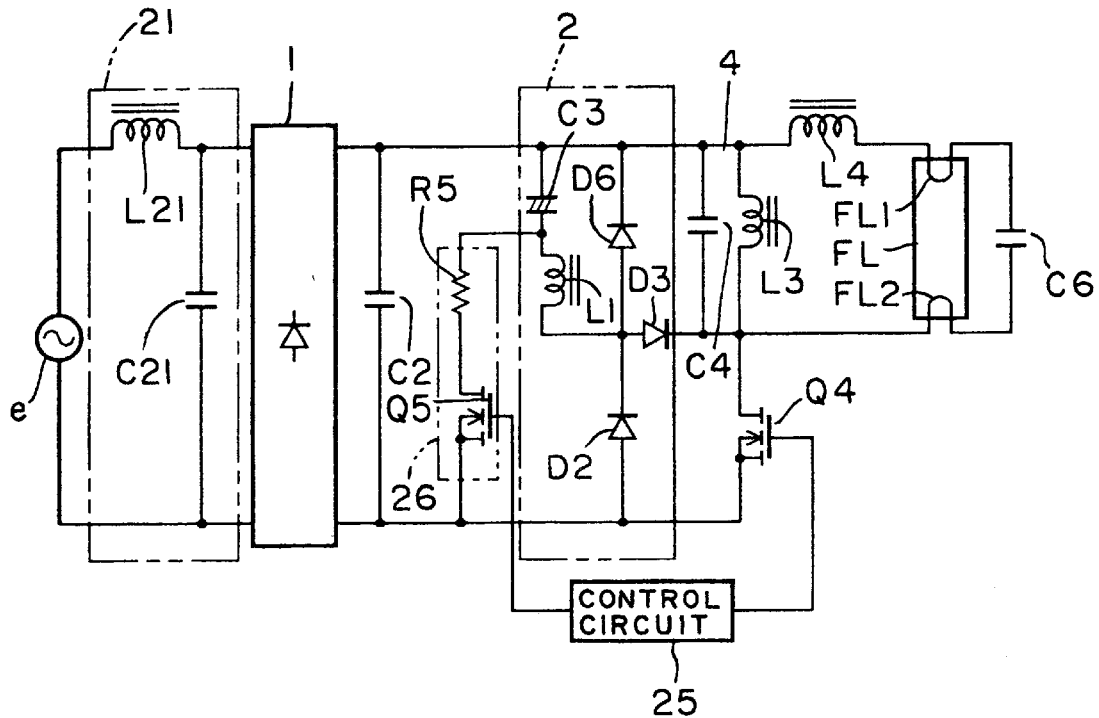
FIG. 50 is a circuit diagram of a discharge lamp lighting device according to a 46th embodiment of the present invention.

Referring not to FIG. 50, a discharge lamp lighting device according to the 46th embodiment of the invention, has the same configuration as that of the 41st embodiment except that a field effect transistor Q4 is included as a switching element and a control circuit 25 is connected to the field effect transistor Q4. In addition, an auxiliary charging circuit 26 is connected to the control circuit 25. The auxiliary charging circuit 26 includes a series circuit that consists of a resistance R5 and a field effect transistor Q5 serving as a switch. The auxiliary charging circuit is connected to the connecting point of the charge capacitor C3 and the inductor L1

Next, the function of the 46th embodiment is explained hereunder. A device according to the 46th embodiment essentially functions in the same manner as the 41st embodiment According to the 46th embodiment described above, prior to actuation of the field effect transistor Q4, the control circuit 25 turns on the field effect transistor Q5. Then, after the charge capacitor C3 is sufficiently charged, the control circuit 25 turns off the field effect transistor Q5 and turns on the field effect transistor Q4, thereby actuating the inverter circuit 3.

By starting the function of the inverter circuit 3 after the charge capacitor C3 is sufficiently charged as described above, a high peak current is prevented from flowing into the inductor L1, the second diode D3, the third diode D6 and the transistor Q1. By thus protecting the transistor Q1 and other elements from stress the embodiment enables the reduction of the sizes of those elements through reducing the capacity of withstanding voltage. In addition, since the control circuit 25 is adapted to control both field effect transistors Q4, Q5, control is more easily performed. Furthermore, since the auxiliary charging circuit 26 remains inactive under normal circumstances, there is no danger of a decrease in efficiency Further, the same effect can be achieved by connecting a control circuit 22 to any one of the 42nd, 43rd and 44th embodiments.

Next, the 47th through the 50th embodiments of the invention are explained, referring to FIGS. 51 through 54

Figure 51:
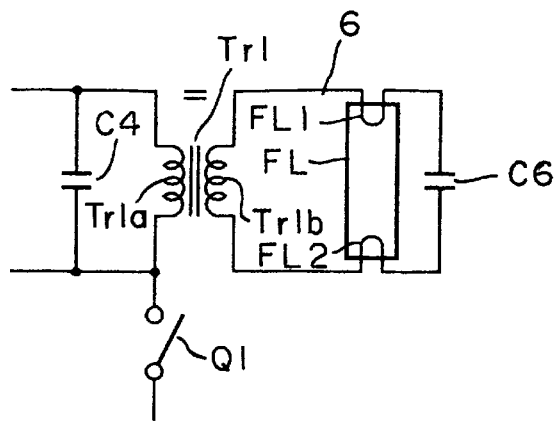
FIG. 51 is a circuit diagram of a part of a discharge lamp lighting device according to a 47th embodiment of the present invention.
Figure 52:
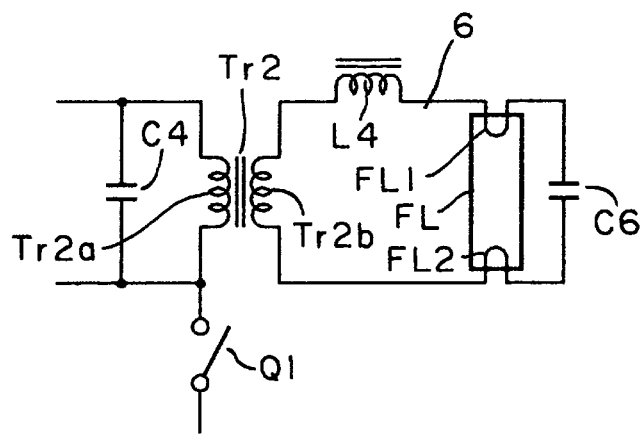
FIG. 52 is a circuit diagram of a part of a discharge lamp lighting device according to a 48th embodiment of the present invention.
Figure 53:
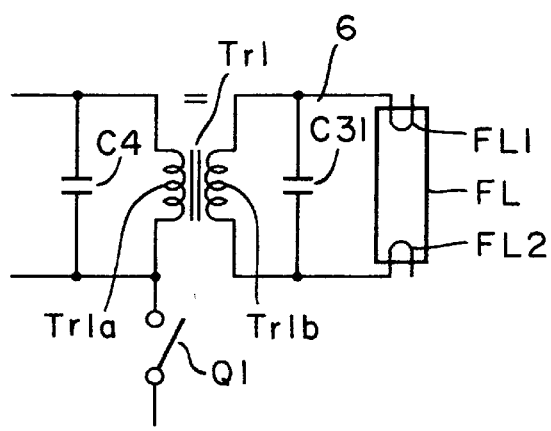
FIG. 53 is a circuit diagram of a part of a discharge lamp lighting device according to a 49th embodiment of the present invention.
Figure 54:
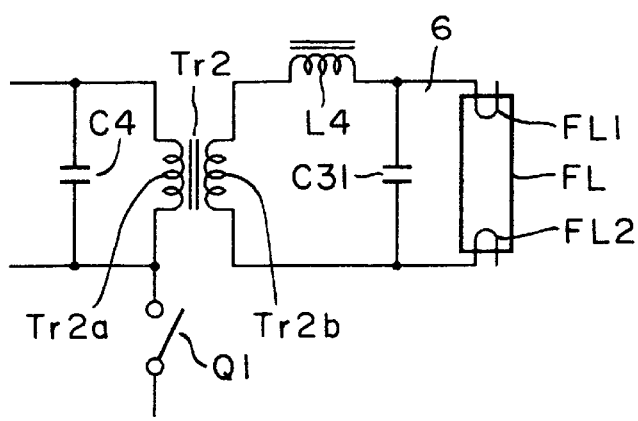
FIG. 54 is a circuit diagram of a part of a discharge lamp lighting device according to a 50th embodiment of the present invention.

FIG. 51 is a circuit diagram of a load circuit according to the 47th embodiment of the present invention; FIG. 52 is a circuit diagram of a load circuit according to the 48th embodiment of the present invention; FIG. 53 is a circuit diagram of a load circuit according to the 49th embodiment of the present invention, and FIG. 54 is a circuit diagram of a load circuit according to the 50th embodiment of the present invention. Any one of these embodiments can be used in any of the first through the 46th embodiments.

Referring now specifically to FIG. 51, according to the 47th embodiment of the invention, a leakage flux type transformer Tr1 is used instead of the resonance inductor L3 and the ballast L4. The primary winding Tr1a of transformer Tr1 is connected to the resonance capacitor C4. The secondary winding Tr1b is connected to an end of the combination of the filaments FL1, FL2 of the fluorescent lamp FL.

Referring now to FIG. 52, according to the 48th embodiment of the invention, a close-coupled transformer Tr2 is used instead of the resonance inductor L3. The primary winding Tr2a of the transformer Tr2 is connected to the resonance capacitor C4. The secondary winding Tr2b is connected through the ballast L4 to one end of the combination of the filaments FL1, FL2 of the fluorescent lamp FL.

Referring now to FIG. 53, according to the 49th embodiment of the invention, instead of the starting capacitor C6 which, in the embodiment of FIG. 52, is connected to the other end of filaments FL1, FL2, a starting capacitor C31 is connected to one end of the combination of the filaments FL1, FL2. This embodiment does not permit preheating of the filaments FL1, FL2.

Referring now to FIG. 54, according to the 50th embodiment of the invention, instead of using the starting capacitor C6 which in the embodiment of FIG. 52, is connected to the other end of filaments FL1, FL2, according to this embodiment, a starting capacitor C31 is connected to the one end of the combination of the filaments FL1, FL2.

Further, in any one of the embodiments described above, the fluorescent lamp FL is not limited to a single lamp. The same effect can be achieved by connecting a plurality of lamps in series or in parallel.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power supply device including:

a rectifying means for rectifying alternating current from an AC power supply;

a first capacitor connected in parallel with an output terminal of said rectifying means;

a diode connected in series in the normal polarity with an end of said first capacitor;

a second capacitor connected in parallel with said first capacitor through said diode;

a partially smoothed circuit which includes an inductance element and a charge capacitor and is connected in parallel with said second capacitor, the second capacitor adapted to charge said charge capacitor at a voltage lower than the maximum instantaneous voltage output from the rectifying means;

an inverter circuit which includes a parallel resonance circuit, a switching element and a second resonance capacitor;

said inverter circuit being connected in parallel with said partially smoothed circuit;

said parallel resonance circuit having a first resonance capacitor and a resonance inductor;

said switching element being connected in series with said parallel resonance circuit;

said second resonance capacitor being connected in parallel with said switching element;

said inverter circuit being of a type effective to generate high frequency voltage by means of switching actions of said switching elements;

said charge capacitor having a charge voltage;

said first capacitor supplies current to said resonance inductor when said switching element is active and said output terminal of said rectifying means is at a higher voltage than said charge voltage;

said second capacitor supplies current to said resonance inductor when said switching element is active and said output terminal of said rectifying means is at a lower voltage than said charge voltage;

said second capacitor is charged by a first and second resonance condition when said switching element is not active;

said first resonance condition is at least formed between said second capacitor and said resonance inductor; and said second resonance condition is at least formed between said second resonance capacitor and said resonance inductor.

2. A power supply device including:

a first capacitor connected to an AC power supply;

a rectifying means connected to said first capacitor;

a second capacitor connected in parallel to an output terminal of said rectifying means;

a partially smoothed circuit which includes an inductance element and a charge capacitor;

said partially smoothed circuit is connected in parallel with said second capacitor;

said second capacitor being effective to charge said charge capacitor at a voltage lower than a maximum instantaneous voltage output from said rectifying means;

an inverter circuit;

said inverter circuit includes a parallel resonance circuit, a switching element and a second resonance capacitor;

said inverter circuit being connected in parallel with said partially smoothed circuit;

said parallel resonance circuit having a first resonance capacitor and a resonance inductor;

said switching element being connected in series with said parallel resonance circuit;

said second resonance capacitor being connected in parallel with said switching element;

said inverter circuit including means for switching said switching element at a frequency effective to generate high frequency voltage;

said second capacitor is charged by a first and second resonance condition when said switching element is not active;

said first resonance condition is at least formed between said second capacitor and said resonance inductor; and said second resonance condition is at least formed between said second resonance capacitor and said resonance inductor.

3. A power supply device including:

a rectifying means for rectifying alternating current from an AC power supply;

a first capacitor connected in parallel with an output terminal of said rectifying means;

a diode connected to said first capacitor;

a second capacitor connected in parallel with said diode;

a partially smoothed circuit;

said partially smoothed circuit includes an inductance element and a charge capacitor;

said partially smoothed circuit is connected in parallel with said first capacitor through said second capacitor and said diode;

said second capacitor being effective to charge said charge capacitor at a voltage lower than a maximum instantaneous voltage output from said rectifying means;

an inverter circuit;

said inverter circuit includes a parallel resonance circuit, a switching element and a second resonance capacitor;

said inverter circuit is connected in parallel with said partially smoothed circuit;

said parallel resonance circuit having a first resonance capacitor and a resonance inductor;

said switching element is connected in series with said parallel resonance circuit;

said second resonance capacitor is connected in parallel with said switching element;

means for switching said switching element at a frequency effective for said inverter circuit adapted to generate a high frequency voltage;

said charge capacitor having a charge voltage;

said first capacitor supplies current to said resonance inductor when said switching element is active and said output terminal of said rectifying means is at a higher voltage than said charge voltage;

said second capacitor supplies current to said resonance inductor when said switching element is active and said output terminal of said rectifying means is at a lower voltage than said charge voltage;

said second capacitor is charged by a first and second resonance condition when said switching element is not active;

said first resonance condition is at least formed between said second capacitor and said resonance inductor; and said second resonance condition is at least formed between said second resonance capacitor and said resonance inductor.

4. A power supply device as claimed in claim 1 or 3, wherein said power supply device includes a short-circuiting means adapted to short-circuit said diode in accordance with an output level of said rectifying means.

5. A power supply device as claimed in any one of claims 1, 2 or 3, wherein said power supply device includes a capacitance varying means for changing an effective capacitance of said second capacitor.

6. A power supply device an claimed in claim 1, 2 or 3 wherein said first resonance capacitor and said second resonance capacitor have substantially equal capacitances.

7. A power supply device including:
   a rectifying means for rectifying alternating current from an AC power supply;
   a first capacitor connected to an output terminal of said rectifying means;
   an inverter circuit;
   said inverter circuit includes a parallel resonance circuit series connected with a switching circuit;
   said parallel resonance circuit including a first resonance capacitor and a resonance inductor;
   said switching circuit including a switching element parallel connected with a second resonance capacitor;
   said inverter circuit including means for switching said switching element at a frequency effective to generate a high frequency voltage;
   a partially smoothed circuit which includes a second diode, a third diode and a series circuit consisting of an inductor, a charge capacitor and a first diode;
   said charge capacitor adapted to be charged at a voltage lower than a maximum instantaneous voltage output from said rectifying means;
   said first diode being connected with a polarity corresponding to that of discharge current from said charge capacitor;
   said second diode being connected between said switching element and the combination of said inductor and said first diode in such a polarity as to permit current for charging said charge capacitor to flow therethrough;
   said third diode being connected in parallel with said charge capacitor and said inductor in such a polarity as to permit magnetic energy accumulated in said inductor to flow to said charge capacitor when said charge capacitor is charged;
   said first capacitor is adapted to be charged by a first and second resonance condition when said switching element is not active;
   said first resonance condition is at least formed between said first capacitor and said resonance inductor; and
   said second resonance condition is at least formed between said second resonance capacitor and said resonance inductor.

8. A power supply device including:
   a rectifying means for rectifying alternating current from an AC power supply;
   a first capacitor connected in parallel with an output terminal of said rectifying means;
   a diode connected in series in a normal polarity with an end of said first capacitor;
   a second capacitor connected in parallel with said first capacitor through said diode;
   an inverter circuit which includes a parallel resonance circuit comprising a resonance capacitor and a resonance inductor;
   a switching element connected in series with said parallel resonance circuit;
   said inverter circuit including means for switching said switching element, thereby generating high frequency voltage;
   a partially smoothed circuit which includes a second diode a third diode and a series circuit consisting of an inductor, a charge capacitor and a first diode;
   said change capacitor being charged at a voltage lower than a maximum instantaneous voltage output from said rectifying means;
   said first diode being connected in a polarity corresponding to that of discharge current from said charge capacitor;
   said second diode being disposed connected between said switching element and the combination of said inductor and said first diode in such a polarity as to permit current for charging said charge capacitor to flow therethrough;
   said third diode is connected in parallel with said charge capacitor and said inductor in such a polarity as to permit magnetic energy accumulated in said inductor to flow to said charge capacitor when said charge capacitor is charged;
   said charge capacitor having a charge voltage;
   said first capacitor supplies current to said resonance inductor when said switching element is active and said output terminal of said rectifying means is at a higher voltage than said charge voltage;
   said second capacitor supplies current to said resonance inductor when said switching element is active and said output terminal of said rectifying means is at a lower voltage than said charge voltage;
   said second capacitor is charged by a first and second resonance condition when said switching element is not active;
   said first resonance condition is at least formed between said second capacitor and said resonance inductor; and
   said second resonance condition is at least formed between said second resonance capacitor and said resonance inductor.

9. A power supply device including:
   a first capacitor connectable to an AC power supply;
   a rectifying means connected to said first capacitor;
   a second capacitor connected to an output of said rectifying means;
   an inverter circuit which includes a parallel resonance circuit comprising a resonance capacitor and a resonance inductor, and a switching element connected in series with said parallel resonance circuit, said inverter circuit adapted to generate high frequency voltage by means of switching actions of said switching element;
   a partially smoothed circuit which includes a second diode, a third diode and a series circuit consisting of an inductor, a charge capacitor and a first diode, said charge capacitor being charged at a voltage lower than the maximum instantaneous voltage output from said rectifying means, said first diode connected in such a polarity as to correspond to that of discharge current from said charge capacitor, said second diode disposed between and connected to said switching element and the combination of said inductor and said first diode in such a polarity as to permit current for charging said charge capacitor to flow therethrough, and said third diode being connected in parallel with said charge capacitor and said inductor in such a polarity as to permit magnetic energy accumulated in said inductor to flow to said charge capacitor when said charge capacitor is charged; and said second capacitor is charged by a first and second resonance condition when said switching element is not active, said first resonance condition is at least formed between said second capacitor and said resonance inductor, and said second resonance condition is at least formed between said second resonance capacitor and said resonance inductor such that said second capacitor is charged by currents generated by said first and second resonance conditions.

10. A power supply device including:

a rectifying means for rectifying alternating current from an AC power supply;

a first capacitor connected in parallel with an output terminal of said rectifying means;

a diode connected to said first capacitor;

a second capacitor connected in parallel with said diode;

an inverter circuit which includes a parallel resonance circuit comprising a resonance capacitor and a resonance inductor;

a switching element connected in series with said parallel resonance circuit;

said inverter circuit including means for switching said switching element to generate a high frequency voltage by means of switching actions of said switching element;

a partially smoothed circuit which includes a second diode, a third diode and a series circuit consisting of an inductor, a charge capacitor and a first diode;

said charge capacitor being charged at a voltage lower than a maximum instantaneous voltage output from said rectifying means;

said first diode being connected in a polarity corresponding to that of discharge current from said charge capacitor;

said second diode being connected between said switching element and the combination of said inductor and said first diode in polarity as to permit current for charging said charge capacitor to flow therethrough; and said third diode is connected in parallel with said charge capacitor and said inductor in such a polarity as to permit magnetic energy accumulated in said inductor to flow to said charge capacitor when said charge capacitor is charged;

said charge capacitor having a charge voltage;

said first capacitor supplies current to said resonance inductor when said switching element is active and said output terminal of said rectifying means is at a higher voltage than said charge voltage;

said second capacitor supplies current to said resonance inductor when said switching element is active and said output terminal of said rectifying means is at a lower voltage than said charge voltage;

said second capacitor is charged by a first and second resonance condition when said switching element is not active;

said first resonance condition is at least formed between said second capacitor and said resonance inductor; and said second resonance condition is at least formed between said second resonance capacitor and said resonance inductor.

11. A power supply device as claimed in claim 7, 8, 9, or 10, wherein:

said power supply device includes a control circuit adapted to produce at least a startup frequency and a normal frequency;

said starting frequency is higher than said normal frequency;

said control circuit is adapted to control a switching frequency of said means for switching such that said switching element is switched at said starting frequency during a startup operating period and said switching element is switched at said normal frequency during a normal operating period.

12. A power supply device as claimed in claim 7, 8, 9 or 10, wherein said power supply device includes an auxiliary charging circuit adapted to charge said charge capacitor during a startup period when said switching element is inactive, said auxiliary charging circuit being inactive in a normal operating period when said switching element is actuated.

13. A power supply device as claimed in any one of the claims 1 to 10 wherein an output of the power supply device is provided to at least one discharge lamp load.

* * * * *